(12) United States Patent
Kondo et al.

(10) Patent No.: US 6,835,439 B1
(45) Date of Patent: Dec. 28, 2004

(54) PANEL FOR AIR BAGS AND METHOD OF MANUFACTURING THE SAME

(75) Inventors: Yasuo Kondo, Kariya (JP); Nobuo Inomata, Kariya (JP); Takashi Ueda, Kariya (JP); Isao Hayashi, Kariya (JP); Tsutomu Okano, Kariya (JP); Haruo Fukuda, Kariya (JP); Yusaku Furukawa, Kariya (JP); Torao Kanayama, Kariya (JP); Akihiro Miwa, Kariya (JP); Hirofumi Yamada, Kariya (JP)

(73) Assignee: Toyota Shatai Kabushiki Kaisha, Kariya (JP)

( * ) Notice: Subject to any disclaimer, the term of this patent is extended or adjusted under 35 U.S.C. 154(b) by 0 days.

(21) Appl. No.: 09/462,502

(22) PCT Filed: Jul. 16, 1998

(86) PCT No.: PCT/JP98/03222

§ 371 (c)(1),
(2), (4) Date: Jan. 24, 2000

(87) PCT Pub. No.: WO99/05007

PCT Pub. Date: Feb. 4, 1999

(30) Foreign Application Priority Data

| Jul. 23, 1997 | (JP) | 9/214138 |
| Jan. 28, 1998 | (JP) | 10/32079 |
| Jan. 28, 1998 | (JP) | 10/32080 |
| Jan. 28, 1998 | (JP) | 10/32081 |
| Jan. 28, 1998 | (JP) | 10-32082 |
| Jan. 29, 1998 | (JP) | 10/33942 |
| Feb. 18, 1998 | (JP) | 10/54342 |

(51) Int. Cl.[7] .......................... B32B 3/00; B32B 7/02; B65D 65/28; B60R 21/20; B60R 21/16

(52) U.S. Cl. .................. 428/156; 428/217; 428/43; 428/57; 428/35.2; 280/732; 280/728.3; 280/728.2; 280/728.1; 264/500; 264/513; 264/520; 264/523

(58) Field of Search ................... 428/156, 35.2, 428/217, 43, 57; 280/728.3, 728.1, 728.2, 732; 264/511, 500, 513, 523, 520

(56) References Cited

U.S. PATENT DOCUMENTS

| 5,069,477 A | * | 12/1991 | Shiraki ...................... 280/732 |
| 5,330,223 A | * | 7/1994 | Hiramitsu et al. ........ 280/728.2 |
| 5,342,085 A | * | 8/1994 | Hirashima et al. .......... 280/728 |
| 5,520,971 A | * | 5/1996 | Naritomi ................... 428/35.2 |
| 5,662,350 A | * | 9/1997 | Bathon et al. ........... 280/728.2 |
| 5,865,461 A | * | 2/1999 | Totani et al. ............ 280/728.3 |
| 6,109,645 A | * | 8/2000 | Totani et al. ............ 280/728.3 |
| 6,129,378 A | * | 10/2000 | Goto et al. ................ 280/732 |
| 6,158,763 A | * | 12/2000 | Dominique et al. ..... 280/728.2 |
| 6,250,669 B1 | * | 6/2001 | Ohmiya ..................... 280/732 |
| 6,299,198 B1 | * | 10/2001 | Nakashima et al. ..... 280/728.3 |
| 6,318,752 B1 | * | 11/2001 | Warnecke et al. ....... 280/728.3 |
| 6,328,924 B1 | * | 12/2001 | Matsumoto et al. ........ 264/511 |

FOREIGN PATENT DOCUMENTS

| JP | 1-81158 | 5/1989 |
| JP | 4-328049 | 11/1992 |
| JP | 5-162603 | 6/1993 |
| JP | 5-94028 | 12/1993 |

(List continued on next page.)

*Primary Examiner*—Harold Pyon
*Assistant Examiner*—Catherine Simone
(74) *Attorney, Agent, or Firm*—Oblon, Spivak, McClelland, Maier & Neustadt, P.C.

(57) ABSTRACT

A panel for an airbag of an automobile is formed by integrally molding a cover body, which is made of a synthetic resin, with a main body, made of another synthetic resin. The panel includes a joint portion, joined with the cover body, and provided around an opening portion formed in the main body. The joint portion constitutes an overlapping portion in which an outer peripheral edge of the cover body is overlapped as being arranged on the inner side of an opening edge of the main body.

17 Claims, 29 Drawing Sheets

FOREIGN PATENT DOCUMENTS

| | | |
|---|---|---|
| JP | 05-319197 | 12/1993 |
| JP | 06-208406 | 7/1994 |
| JP | 06-65119 | 9/1994 |
| JP | 06-69024 | 9/1994 |
| JP | 06-286551 | 10/1994 |
| JP | 06-298033 | 10/1994 |
| JP | 06-336145 | 12/1994 |
| JP | 7-61310 | 3/1995 |
| JP | 07-069158 | 3/1995 |
| JP | 07-137596 | 5/1995 |
| JP | 7-144597 | 6/1995 |
| JP | 07-329677 | 12/1995 |
| JP | 08-169291 | 7/1996 |
| JP | 8-192666 | 7/1996 |
| JP | 08-207621 | 8/1996 |
| JP | 09-052566 | 2/1997 |
| JP | 09-142242 | 6/1997 |
| JP | 09-164861 | 6/1997 |
| JP | 9-2187 | 7/1997 |
| JP | 09-226413 | 9/1997 |
| JP | 09-267708 | 10/1997 |
| JP | 09-277897 | 10/1997 |
| JP | 09-290666 | 11/1997 |
| JP | 9-301013 | 11/1997 |
| JP | 09-315250 | 12/1997 |
| JP | 10-001012 | 1/1998 |
| JP | 10-044910 | 2/1998 |
| JP | 10-76544 | 3/1998 |
| JP | 10-095029 | 4/1998 |
| JP | 10-250519 | 9/1998 |
| JP | 10-291232 | 11/1998 |
| JP | 10-324213 | 12/1998 |

* cited by examiner

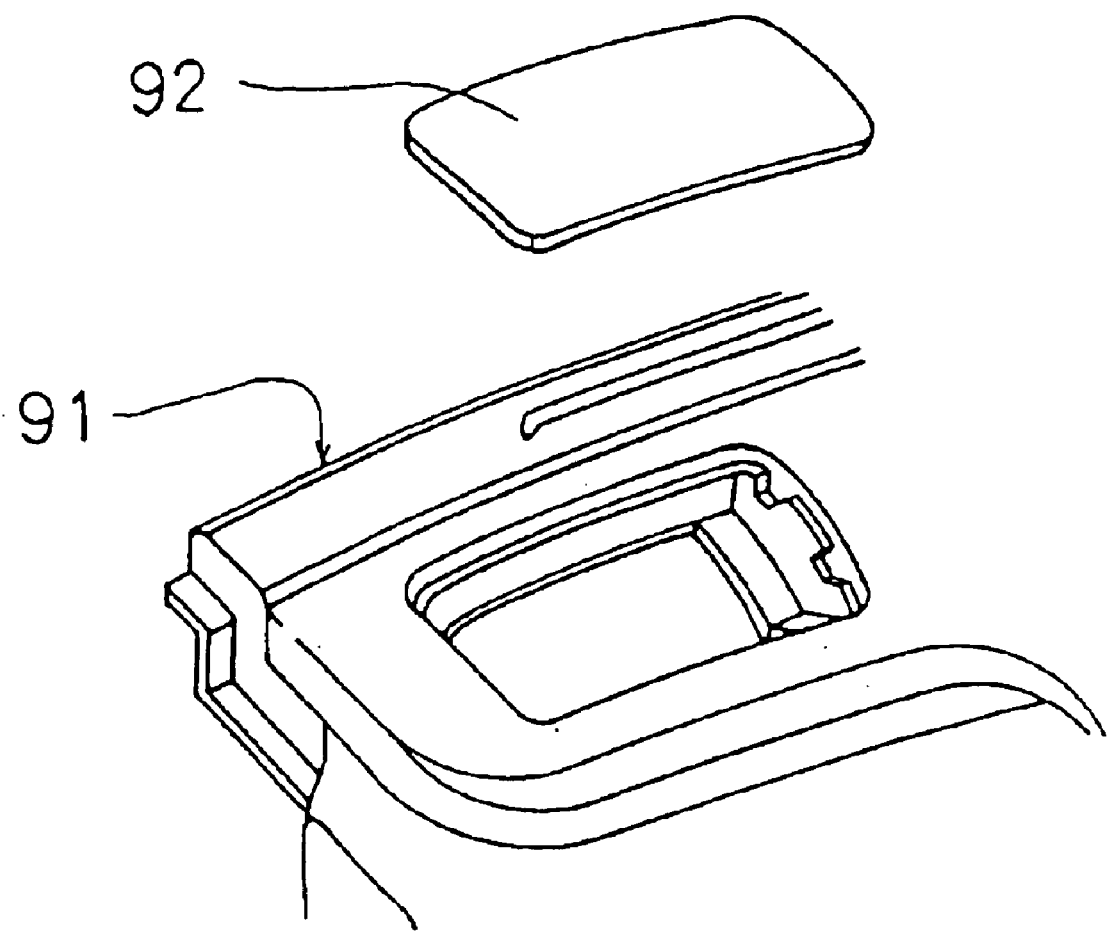

PANEL FOR AIR BAGS AND METHOD OF MANUFACTURING THE SAME

BACKGROUND OF THE INVENTION

1. Technical Field of the Invention

The present invention relates to a method of producing a panel for an airbag of an automobile and the panel for the airbag of an automobile produced by the method, the panel being formed of an airbag cover (i.e., a cover body), made of a first synthetic resin, and the airbag cover or cover body being formed in a main body, the main body being made of a second, different synthetic resin, and the main body being, for example, an instrument panel or a door trim.

2. Discussion of Background

An airbag arranged in front of a front passenger seat of an automobile is stored on a rear side of the main body, the main body being, for example, an instrument panel or a door trim. When the airbag is operated, the airbag cover (i.e., cover body), mounted on the instrument panel, is opened and the airbag swells out in front of the instrument panel.

As shown in FIG. 51, an airbag cover 92 and an instrument panel main body 91 are formed as separate members, and the airbag cover 92 is fixed to the instrument panel main body 91 by a fixture (not shown). The airbag swells out in front of the instrument panel by rupturing a weak portion, such as a thin wall portion formed in advance in the airbag cover 92.

However, in the panel for the airbag having the structure described above, each of the instrument panel main body 91 and the airbag cover 92 are made in separate processes. Accordingly, a certain number of producing steps are required with respect to each of the instrument panel main body 91 and the airbag cover 92. Further, it is necessary to perform an assembly step to integrate both the members 91 and 92 with respect to each other and arrange a fixture. Accordingly, a problem exists in that the entire production cost of the airbag is increased.

This problem is similarly caused when a door trim, instead of the instrument panel, is set on a main body and the airbag cover is formed therein.

In consideration of such conventional problems, the present invention provides a panel for an airbag for an automobile which is produced easily and at a low cost, and provides a production method for the panel for the airbag of the automobile.

SUMMARY OF THE INVENTION

An embodiment of the present invention is a panel for an airbag of an automobile formed by integrally two-color molding a cover body, made of a first soft synthetic resin, with a main body, made of a second hard synthetic resin, the panel comprising:

a joint portion joined with the cover body provided around an opening portion formed in the main body, wherein the joint portion constitutes an overlapping portion in which an outer peripheral edge of the cover body is overlapped as being arranged on the inner side of an opening edge of the main body and the overlapping portion is welded together in two-color molding the main body with the cover body.

In the present invention, the overlapping portion is arranged around the opening portion (an airbag swelling-out portion) of the main body, such as the instrument panel, in which an outer peripheral edge of the cover body (airbag cover) is overlapped as being arranged on the inner side of an opening edge of the main body. Therefore, neither a fixture, for connecting both the members, nor a connecting step, are required. Thus, in accordance with the present invention, the number of production steps and cost can be greatly reduced compared with a conventional product in which the cover body and the main body, such as the instrument panel, are separately formed.

With respect to the above-described embodiment of the present invention, it is preferable that the synthetic resin of the main body is a hard synthetic resin and the synthetic resin of the cover body is a soft one. Thereby, a rupturing operation of the cover body, which swells out of the airbag, can be smoothly performed by the soft synthetic resin, and the main body, such as the instrument panel, can maintain an excellent rigidity due to the hard synthetic resin.

As a particular means for improving joining strength of both the members in the overlapping portion, for example, it is preferable that a concavo-convex portion, having a serrated shape or a downwardly convex shape, is formed on a lower face of the main body in the overlapping portion as in an embodiment of the present invention. This constitution utilizes a so-called anchor effect yielded from a part of the synthetic resin of the cover body biting into a concave portion of the concavo-convex portion of the main body at a molding time of the cover body. The joining strength of both the members is improved by this anchor effect.

Further, distortion can be prevented at the time of molding a peripheral edge of the opening portion of the main body. Namely, when the cover body is molded, after the molding of the main body, the concavo-convex portion of the overlapping portion becomes resistance to an injection force of a material for molding the cover body. Therefore, no peripheral edge of the opening portion of the main body is distorted due to the injection force which pushes on the overlapping portion of the main body.

In each of the above two means, the joining strength of the main body and the cover body can be improved by an easy method and a simple structure.

Further, as in an embodiment of the present invention, it is preferable that a surface of a periphery of the cover body has a step portion backing to a rear surface of the cover body and facing the edge of the opening portion of the main body, thereby, a groove portion, having a closed curve shape, is formed in a boundary portion of an end portion of the opening portion of the main body in the cover body, and a thin wall portion, which ruptures, and a non-thin wall portion, which does not rupture at the operating time of the airbag, are formed along the groove portion in the cover body in a single line shape or a shape of plural continuous lines.

In this case, in a portion continuously connected to the groove portion, it is possible to easily form the thin wall portion thinner than the thicknesses of wall portions in the other portions. The thin wall portion ruptures earlier than peripheral portions when pressure is applied to this thin wall portion, and thus the thin wall portion practically becomes a rupturing portion of the cover body when the airbag is operated.

The boundary portion of the cover body and the main body can be easily observed because of the groove portion, and an excellent appearance in design may be also given depending on a shape of groove shape.

When the thin wall portion ruptures and the cover body is opened, it is preferable that the shape of a line forming the thin wall portion and the shape of a line forming the non-thin wall portion are set onto the cover body such that the non-thin wall portion becomes a rotating central axis of an opening movement of the opening portion of the cover body.

In this case, when the airbag is operated and the thin wall portion ruptures, a turning moment, with the non-thin wall portion as a rotating center, is applied to a ruptured cover portion and the cover body is easily opened. Accordingly, resistance to the airbag swelling-out is reduced and the airbag easily swells out.

For example, a combination of the shape of the line forming the thin wall portion and the shape of the line forming the non-thin wall portion, so as to set the non-thin wall portion on the rotating central axis of the opening movement of the opening portion of the cover body as mentioned above, is constructed as will be described with respect to a particular embodiment of the present invention in more detail below.

For example, as in an embodiment of the present invention, the non-thin wall portion is formed into a shape of one transverse line on an upper or lower side of the cover body, and the thin wall portion is formed in a U-shape (i.e., a quadrilateral shape with one side opened) along a groove portion in three directions except for the line forming the non-thin wall portion (see FIG. 2). Thus, a cover portion having the quadrilateral shape with one side opened is easily opened with the non-thin wall portion of the line shape as a rotating center.

Further, as in an embodiment of the present invention, the non-thin wall portion is formed into a shape of one transverse line on an upper or lower side of the cover body and the thin wall portion is formed along an entire periphery of the groove portion such that a line forming the non-thin wall portion is included in an inner side (see FIG. 9).

In this case, as described later, it is preferable that the cover body is connected to an airbag case through a rib. Although the thin wall portion is formed into a shape of a closed curve, the cover is not scattered, due to being released from restriction when the airbag is operated, even when the thin wall portion having the closed curve shape is entirely ruptured throughout its periphery, since the cover body is connected to the airbag case through the rib.

With respect to advantages of this construction, the thin wall portion of the closed curve shape is entirely ruptured throughout its periphery, and the cover body is separated from the main body as the cover body is connected to the airbag case through the rib. Accordingly, no stress is applied to the main body by the operation of the airbag in its operation. Further, there are no situations in which the main body is ruptured and a ruptured portion is possibly scattered.

As in an embodiment of the present invention, the non-thin wall portion can be formed into a shape of one transverse line on each of upper and lower sides of the cover body, and the thin wall portion can be formed into a shape of one longitudinal line on each of left-hand and right-hand sides of the cover body. A second thin wall portion, which is not formed along a groove portion, is formed into a shape of one transverse line in a central portion of the cover body. The entirety of the first and second thin wall portions can be formed in an H-shape (see FIG. 10).

In this case, the second thin wall portion, provided at the center of the cover, is ruptured and the cover is opened in two directions so that resistance of the cover to the airbag swelling-out is further reduced.

As in an embodiment of the present invention, the non-thin wall portion is formed into a shape of one transverse line on each of upper and lower sides of the cover body, and the thin wall portion can be formed along an entire periphery of a groove portion such that a line forming the non-thin wall portion is included in an inner side. Further, a second thin wall portion, which is not formed along the groove portion, is formed into a shape of one transverse line in a central portion of the cover body. The entirety of the first and second thin wall portions can be formed in a shape in which two quadrilaterals are lined up (see FIG. 14).

As a result, effects similar to those in one of the embodiments of the present invention described above can be obtained. Further, since the second thin wall portion, formed at the center of the cover, is ruptured, resistance to the airbag swelling-out is further reduced. In this case, as described later, it is preferable that the cover body is connected to the airbag case through the rib. Thus, the cover can be prevented from scattering when the airbag is operated.

Further, as in an embodiment of the present invention, the non-thin wall portion can be formed into a shape of one longitudinal line on each of left-hand and right-hand sides of the cover body, and the thin wall portion can be formed into a shape of one transverse line on each of upper and lower sides of the cover body. A second thin wall portion, which is not formed along a groove portion, is formed into a shape of one longitudinal line in a central portion of the cover. The entirety of the first and second thin wall portions can be formed in an H-shape (see FIG. 15).

As a result, operating effects, similar to those in one of the embodiments of the present invention described above, can be obtained.

Further, as described with respect to an embodiment of the present invention, the non-thin wall portion can be formed into a shape of one longitudinal line on each of left-hand and right-hand sides of the cover body, and the thin wall portion can be formed along an entire periphery of a groove portion such that a line forming the non-thin portion is included with an inner side. Further, a second thin wall portion is not formed along the groove portion, but is formed into a shape of one longitudinal line in a central portion of the cover body. The entirety of the first and second thin wall portions can be formed in a shape in which two quadrilaterals are lined up (see FIG. 17).

As a result, operating effects similar to those in one of the embodiments of the present invention described above can be obtained. In this case, as described later, it is also preferable that a rib, for a connection with the airbag case, is arranged in the cover body.

Namely, as described with respect to an embodiment of the present invention, it is preferable that the rib is projected in the non-thin wall portion and connected to the airbag case through a connecting member.

Since the rib is arranged, a portion near this rib is reinforced and the non-thin wall portion, having the rib, can be reliably set to a rotating center of an opening movement when the cover body opens.

Further, since the rib is connected to the airbag case through the connecting member, it is possible to reliably prevent the cover body from being separated from the airbag case and scattered when the airbag is operated.

Next, the embodiment of the present invention is a panel for an airbag of an automobile formed by integrally molding a cover body, made of a synthetic resin, with a main body, made of another synthetic resin, the panel comprising:

a joint portion, joined with the cover body, provided around an opening portion formed in the main body, wherein the joint portion constitutes an overlapping portion in which an outer peripheral edge of the cover body is overlapped as being arranged on the inner side of an opening edge of the main body, and the opening portion formed in the main body is mechanically connected to an outer peripheral edge of the cover body. This mechanical connection, for example, can be achieved by means of caulking and a fitting portion.

In this case, since the main body and the cover body are mechanically connected to each other by, for example, caulking, there are no restrictions in which compatibility is required in a synthetic resin material used in the main body and the cover body compared with a conventional connection using, for example, melt-bonding.

Next, an embodiment of the present invention resides in a panel for an airbag including:

a cover body comprising a first synthetic resin material;

a main body comprising a second synthetic resin material compatible with the first synthetic resin material, formed by two-color molding after forming the cover body; and a deformation restricting portion provided at the outer peripheral edge of the cover body and engaged with a mold face, wherein the main body comprises an opening portion which is closed by the cover body; and wherein the deformation restricting portion restricts deformation of the cover body caused by a molding pressure which acts at a molding time of the main body.

When the main body is two-color molded with the cover body in a semisolid state within the mold, a large molding pressure acts on the outer peripheral edge of the cover body. In this case, since the cover body is engaged with the mold face because of the deformation restricting portion, no cover body is deformed even when the molding pressure acts on the cover body. This is particularly effective when a soft material is used as a material of the cover body.

Further, as in an embodiment of the present invention, it is preferable that the deformation restricting portion is constituted of a convex strip having an angular cross-section or a concave groove.

In this case, the cover body and the mold can be easily engaged with each other by the convex strip or the concave groove of the cover body, and a concave groove or a convex strip formed on the mold face and corresponding to the convex strip or the concave groove of the cover body. Therefore, it is possible to reliably prevent the outer peripheral edge of the cover body from being retreated, deformed or the like.

Further, an embodiment of the present invention resides in a panel for an airbag including:

a main body which has an opening portion comprising a first synthetic resin material;

a cover body comprising a second synthetic resin material compatible with the first synthetic resin material, formed by two-color molding after forming the main body; and a deformation restricting portion provided at the periphery of the opening portion and engaged with a mold face, wherein the opening portion of the main body is closed by the cover body; and wherein the deformation restricting portion restricts deformation of the cover body caused by a molding pressure which acts at a molding time of the main body.

In this case, when the cover body for closing a swelling-out port of the airbag is molded by two-color molding within this swelling-out port with respect to the main body in a semisolid state inside of the mold, a large molding pressure acts on a main body portion at a peripheral edge of the airbag swelling-out port. Here, since the main body is engaged with the mold face by the deformation restricting portion, the main body is not deformed even when the molding pressure acts thereon. Accordingly, there is no problem that a shape of the peripheral edge of the airbag swelling-out port is shifted from its predetermined shape and becomes wavy.

Further, as in an embodiment of the present invention, it is preferable that the deformation restricting portion is a convex strip having an angular cross-section or a concave groove.

Also in this case, the main body and the mold can be easily engaged with each other by the convex strip or the concave groove of the main body, and a concave groove or a convex strip formed on the mold face and corresponding to the convex strip or the concave groove of the main body. Therefore, deformation of the main body, such as wavy deformation, can be reliably prevented.

Next, an embodiment of the present invention resides in a panel for an airbag of an automobile formed by integrally molding a cover body, made of a synthetic resin, with a main body, made of another synthetic resin, and providing a thin wall portion which ruptures when the airbag is operated:

wherein the main body and the cover body are integrally molded by one-color molding;

wherein a crack preventing layer is provided on a rear surface of a general portion, which is a portion not including the thin wall portion of the cover body; and wherein the crack preventing layer prevents cracks of the general portion.

For example, the crack preventing layer can be achieved by joining a net made of polyamide (PA) and such with the rear face of the cover body in insert molding.

In this case, the main body and the cover body, for closing an opening portion of the main body, are integrally molded by one-color molding and are produced by the synthetic resin material. There is no discontinuity caused by the difference between materials in a boundary portion of the main body and the cover body so that an external appearance of the panel is improved. Further, since the main body and the cover body are integrally molded by one-color molding, producing and assembly steps are reduced.

Further, since the crack preventing layer is formed on the rear face of the general portion of the cover body, no general portion of the cover body formed by the synthetic resin material is cracked, so as to form broken pieces, when the airbag inflates.

Further, as in an embodiment of the present invention, it is preferable that a rib projects into the cover body on the rear face of a portion in which no thin wall portion is formed. It is also preferable that a connecting member made of a metal and extending from a side of the main body is connected to the rib, and a projection is formed on a surface of this connecting member and bites into a surface of the rib when the connecting member is connected to the rib.

In this case, the thin wall portion is ruptured as the airbag inflates. Accordingly, the cover body is rotated and opened into a cabin with a portion near a root of the rib as a hinge center. At this time, an upward pulling-up force is applied to the cover body. However, since the projection of the connecting member and the rib of the cover body are connected to each other, such that the projection bites into the rib, no cover body is separated from the connecting member so that scattering of the cover body is reliably prevented.

Next, for example, an embodiment of the present invention reside in a method for producing the panel for the airbag of an automobile.

Namely, as in an embodiment of the present invention, a method for producing a panel for an airbag of an automobile includes integrally molding a cover body, made of a synthetic resin, with a main body, made of another synthetic resin, the method comprising the steps of:

preparing a thermoplastic material having compatibility as the synthetic resin forming each of the main body and the cover body;

arranging a movable core in a male or female die as a mold;

interrupting a portion between a first cavity portion for forming a first member and a second cavity portion for forming a second member by allowing the core to project and contact an opposite die;

injecting a material of the first member into the first cavity portion;

forming a communicating portion between the first and second cavity portions by allowing the core to retreat; and injecting a material of the second member into the second cavity portion and the communicating portion so that an overlapping portion of both the first and second members is formed and adhered and both the first and second members are made integral with each other.

The key feature of this producing method is that the main body and the cover body are integrally formed by injection molding by the following construction and method.

Namely, the synthetic resins forming both the members are set to be compatible with each other. In the meantime, the movable core is arranged in a male or female die for the injection molding. First, this core is projected and comes in contact with the opposite mold. Thus, the portion between the first and second cavity portions is interrupted, and the material of the first member, as a material of either of the main body or the cover body, is injected into the first cavity portion such that no first member flows into the second cavity.

In a subsequent second step, the core is retreated so that the first and second cavities are communicated with each other, and the material of the second member is injected into the second cavity portion. Both the members are made integral with each other by forming an overlapping portion of both the members in the communicating portion of both the cavity portions and adhering the overlapping portion utilizing compatibility of both the materials.

As mentioned above, in this producing method, the main body and the cover body can be made by one injection molding by a two-color molding method so that no fixture for connecting both the members to each other is required and no connecting step is also required. Accordingly, the number of producing steps and cost can be greatly reduced compared with a conventional product in which the main body and the cover body are separately formed.

Further, it is preferable that a projecting portion, of a predetermined width, is continuously formed along a boundary portion of both the cavities in the opposite mold in a contact portion of the core and the opposite mold. It is also preferable that a groove portion, having a closed curve shape of the predetermined width, is formed in a boundary portion of the first and second members. It is further preferable that a thin wall portion ruptures at an operating time of the airbag and a non-thin wall portion, unbroken at the operating time of the airbag, are formed along the groove portion of the cover body in a single continuous line shape or a shape of plural continuous lines.

In this case, the projecting portion, projected in a larger extent than its peripheral portion and having a relatively narrow width, is formed in the mold opposed to the core so that the groove portion, having a closed curve shape, can be easily formed. In a position continuously connected to the groove portion, a thin wall portion, thinner than the thicknesses of wall portions in other positions, can be easily formed by forming the groove portion. Since the thin wall portion is ruptured earlier than its peripheral portion when pressure is applied to the thin wall portion, this thin wall portion becomes a ruptured portion of the cover body when the airbag is operated.

The boundary portion of the cover body and the main body (first and second members) can be easily observed by the groove portion. Further, an excellent appearance in design can be also given depending on a groove shape.

When the thin wall portion is ruptured and the cover body is opened, it is preferable that the shape of a line forming the thin wall portion and the shape of a line forming the non-thin wall portion are set onto the cover body such that the non-thin wall portion becomes a rotating central axis of an opening movement of the opening portion of the cover body.

In this case, when the airbag is operated and the thin wall portion is ruptured, a rotating moment, with the non-thin wall portion as a rotating center, is applied to a broken cover portion and the cover body is easily opened. Accordingly, resistance to swelling-out of the airbag is reduced and the airbag can be easily swollen out.

A combination of thermoplastic material having compatibility is constructed by a combination of polypropylene resin forming the main body and olefin thermoplastic elastomer (TPO) forming the cover body and the like.

BRIEF DESCRIPTION OF THE DRAWING FIGURES

FIG. 51 is a perspective view of a panel for an airbag in a conventional art.

DETAILED DESCRIPTION OF THE PREFERRED EMBODIMENTS

Embodiment 1

Figure 1:
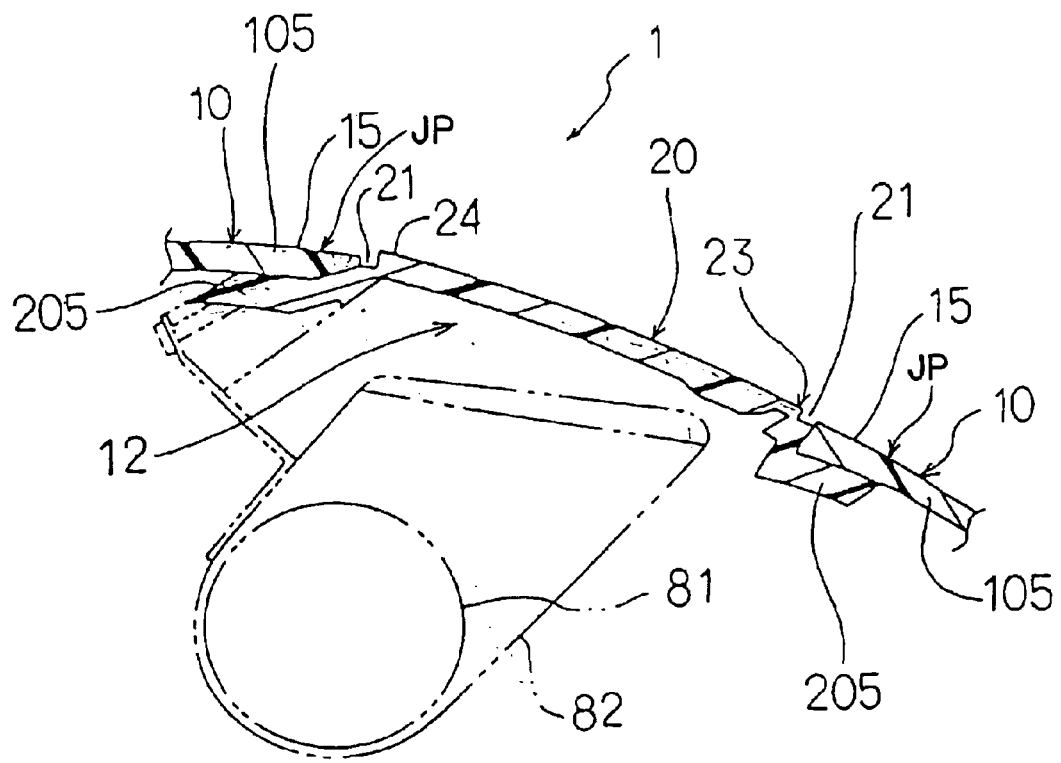
FIG. 1 is a cross-sectional view of a panel for an airbag according to Embodiment 1 taken along a line 1/6—1/6 of FIG. 2.
Figure 2:
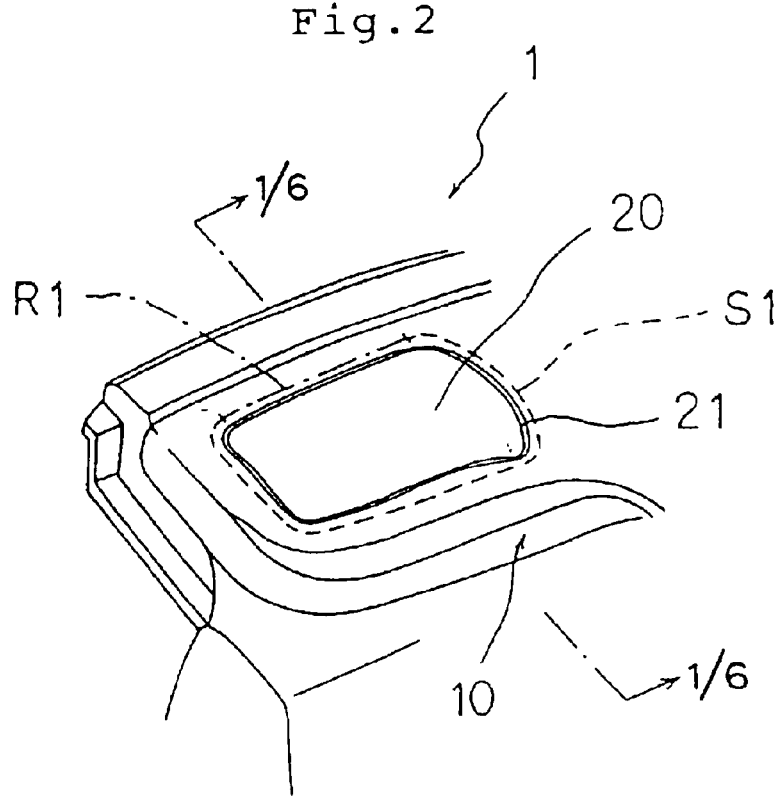
FIG. 2 is a perspective view of the panel for an airbag according to Embodiment 1.

In this embodiment, as shown in FIGS. 1 and 2, a panel 1 for an airbag of an automobile is constituted such that an airbag cover (cover body) 20, made of olefin thermoplastic elastomer (TPO), is integrally molded with a main body 10, constituted by an instrument panel made of polypropylene resin (PP) as a hard synthetic resin.

A joint portion JP joined with the cover body 20 is formed around an opening portion 12 formed in the main body 10. This joint portion JP constitutes an overlapping portion 15 in which an outer peripheral edge 205 of the cover body 20 is arranged on an inner side of an opening edge 105 of the main body 10 and is overlapped with this opening edge 105.

Explanations of each of these constructional elements will next be supplemented.

As shown in FIG. 1, the panel 1 for an airbag in this example stores an airbag 81 therein and is arranged on a front passenger seat side of an automobile. The panel 1 is constituted of a main body 10, in the form of an instrument panel, and a cover body (airbag cover) 20.

As shown in FIG. 1, a surface of a periphery of the cover body 20 has a step portion 210 backing to a rear surface of the cover body 20 and facing the edge 120 of the opening portion 12 in the main body 10. Thereby, a groove portion 21, having a closed curve shape, is formed in a boundary portion of the opening portion 12 of the main body 10 in the cover body 20. A thin wall portion 23 is formed in the cover body 20 along a groove portion 21 and is ruptured at an operating time of the airbag 81. Along a line S1 of FIG. 2 (represented by dashes), the thin wall portion 23 is formed to have an approximate quadrilateral shape with one side opened (i.e., the side represented by the line R1 which is shown by the dot-and-dash configuration and which will be explained in more detail below).

The main body 10 and the cover body 20 are integrally formed as follows by two-color molding using polypropylene resin and olefin elastomer. Both the two kinds of synthetic resins are thermoplastic and have compatibility (a consolute property).

Figure 3A:
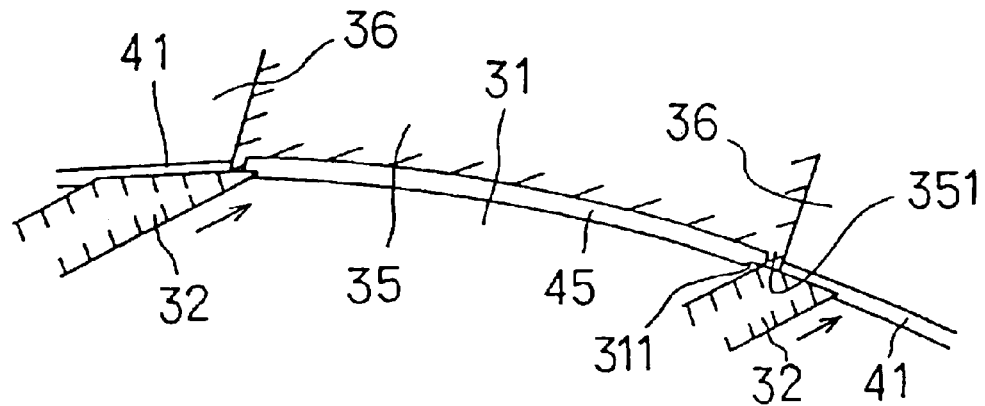
FIGS. 3A to 3C are arrangement plan views of a mold in a process of molding the panel for an airbag according to Embodiment 1.

First, as shown in FIG. 3A, a core 32 is projected and comes in contact with a projecting portion 351 of an opposite mold 35. The clearance between a first cavity portion 41 and a second cavity portion 45 is interrupted so that no polypropylene resin, as a material of a first member forming the main body 10, flows into the second cavity portion 45. Next, the polypropylene resin, forming the main body 10, is injected into the first cavity portion 41.

Figure 3B:
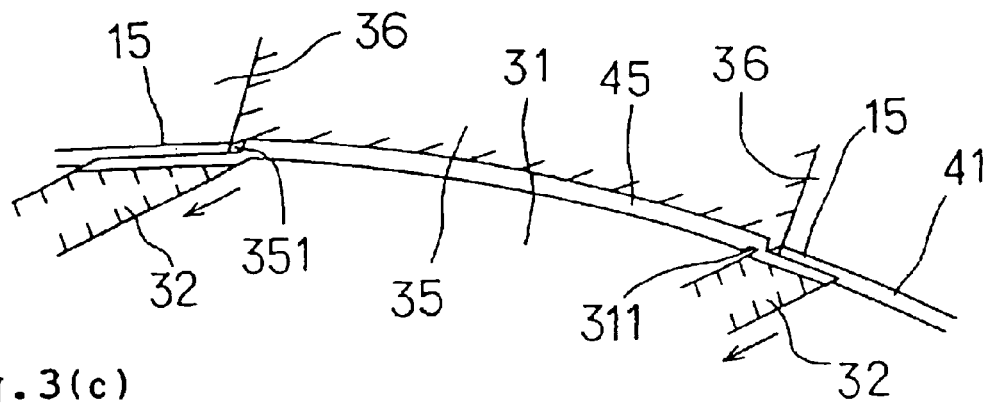

Thereafter, as shown in FIG. 3B, the core 32 is retreated in a subsequent second step so that the first cavity portion 41 and the second cavity portion 45 can communicate with each other. Then, the olefin elastomer, as a material of a second member forming the cover body 20, is injected into the second cavity portion 45 so that an overlapping portion 15 of both the members 10 and 20 is formed in a communicating portion of both the cavity portions 41 and 45. Both the members 10 and 20 are integrally made by adhering these members to each other by utilizing compatibility of both the materials.

Figure 3C:
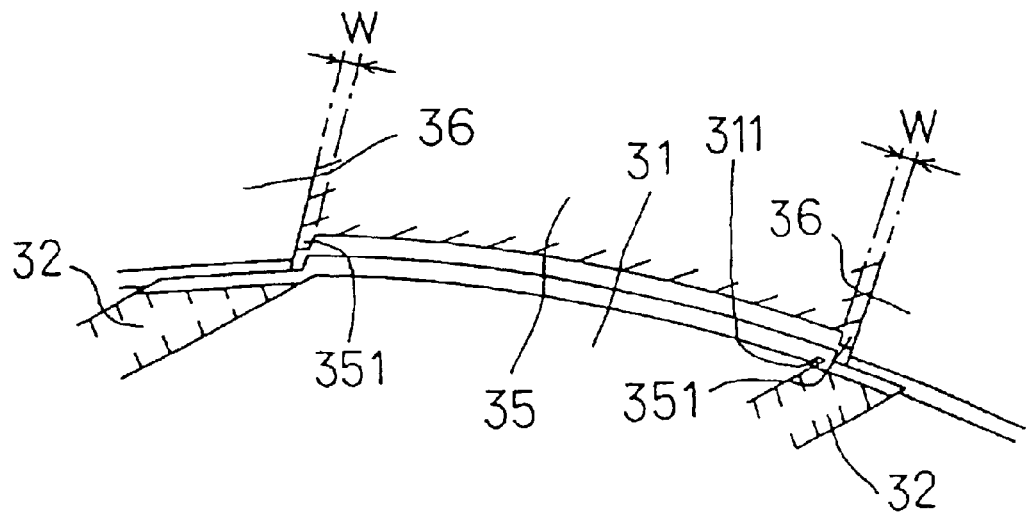

Finally, as shown in FIG. 3C, movable molds 35 and 36 are separated from each other so that a molded article (the panel 1 for the airbag) is taken out. Thereafter, a further processing step, such as painting, is performed as necessity requires.

Therefore, in this embodiment, the main body 10, formed by the instrument panel, and the cover body 20 can be made by a continuous one-time injection molding process. Hence, no fixture, for connecting both the members as is a conventionally done, nor connecting step of both the members, is required. Accordingly, the number of producing steps and the cost can be greatly reduced, as compared with the cost of a conventional panel for an airbag for an automobile.

Figure 4:
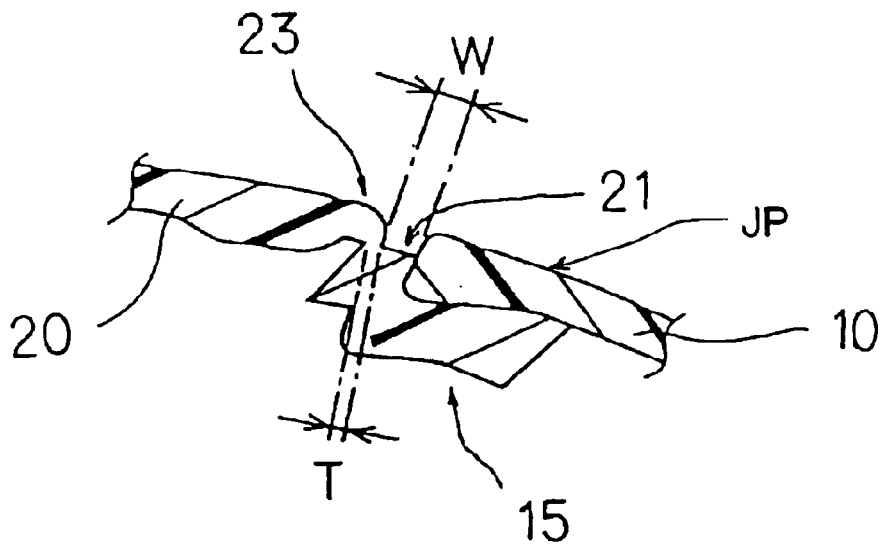
FIG. 4 is an enlarged view of the periphery of a thin wall portion of FIG. 1.
Figure 5:
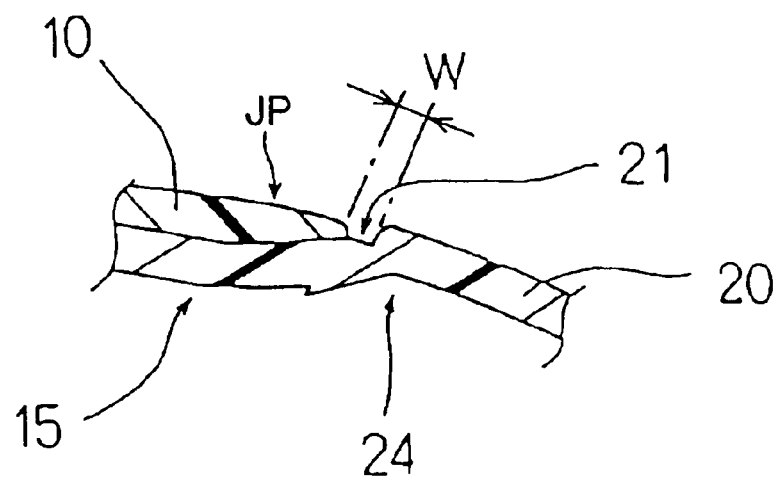
FIG. 5 is an enlarged view of the periphery of a non-thin wall portion of FIG. 1.

Further, in this example, as shown in FIGS. 3A to 3C, a projecting portion 351 of the width W is continuously formed in the opposite mold 35 along a boundary portion of both the cavity portions 41 and 45. Further, a continuous projecting portion 311 is formed along a line S1 (represented by the dashes shown in FIG. 2) in a predetermined end portion of a fixing mold 31. As a result, as shown in FIGS. 4 and 5, a groove portion 21, of the width W formed in the shape of a closed curve, is formed in a boundary portion of the cover body 20 and the main body 10. The thin wall portion 23, ruptured when the airbag 81 operates, and a non-thin wall portion 24, not ruptured when the airbag 81 is operated, are formed into shapes of continuous lines S1 and R1 (as represented by dashes and dot-and-dashes, respectively, in FIG. 2) along the groove portion 21.

As mentioned above, the groove portion 21 (FIG. 2), having the closed curve shape, can be easily formed by forming the projecting portion 351, located in a peripheral portion of the opposite mold 35 and projected from this peripheral portion, and having a relatively narrow width W. Further, the projecting portion 311 is formed in the fixing mold 31 and is opposed to the groove portion 21. Accordingly, in a position adjacent to the groove portion 21, the thin wall portion 23, thinner than wall portions in the other positions, can be formed simultaneously with the molding. The thin wall portion 23 is easily ruptured when pressure caused by swelling-out of the airbag 81 is applied to this thin wall portion 23. Therefore, the thin wall portion 23 becomes a ruptured portion when the airbag 81 operates.

The non-thin wall portion 24 is formed along a transverse line on an upper side of the cover body 20. The thin wall portion 23 (thickness T) is formed into a quadrilateral shape with one side opened along the groove portion 21 in three directions except for the line R1 (see dots-and-dashes in FIG. 2), forming the non-thin wall portion 24 as indicated by the line S1 (see dashes in FIG. 2). Therefore, a cover portion, ruptured in the opening shape on one side of the quadrilateral, is easily opened with the linear non-thin wall portion 24 as a rotating center.

As shown in FIG. 2, the boundary portion of the cover body 20 and the main body 10 can be easily observed by forming the groove portion 21. Further, an excellent appearance in design can be obtained depending on a shape of the groove portion 21.

Embodiment 2

Figure 6:
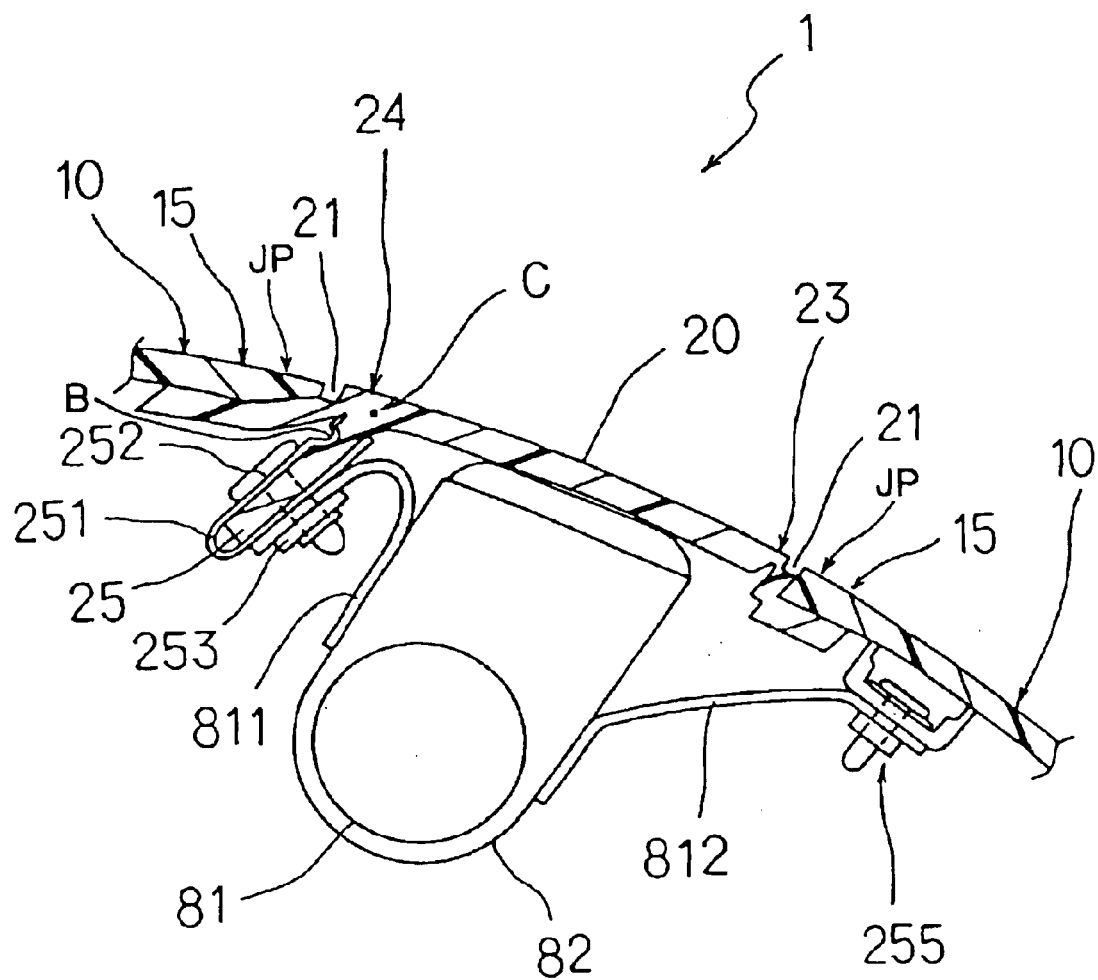
FIG. 6 is a cross-sectional view of a panel for an airbag according to Embodiment 2 taken along a line 1/6—1/6 of FIG. 2.

In this embodiment, as shown in FIG. 6, a rib 25 is projected in the non-thin wall portion 24 in Embodiment 1, and is connected to an airbag case 82 with a connecting member.

Namely, the rib 25, projected onto a rear side of the cover body 20, is supported by a metallic retainer 251 having a bead B for preventing falling-out on its surface. This rib 25 is fixed to a bracket 811 of the airbag case 82 with a bolt 252 and a nut 253.

In this figure, reference numeral 255 designates a fixture for fixing the bracket 812 of the airbag case 82 to the main body 10.

Figure 7A:
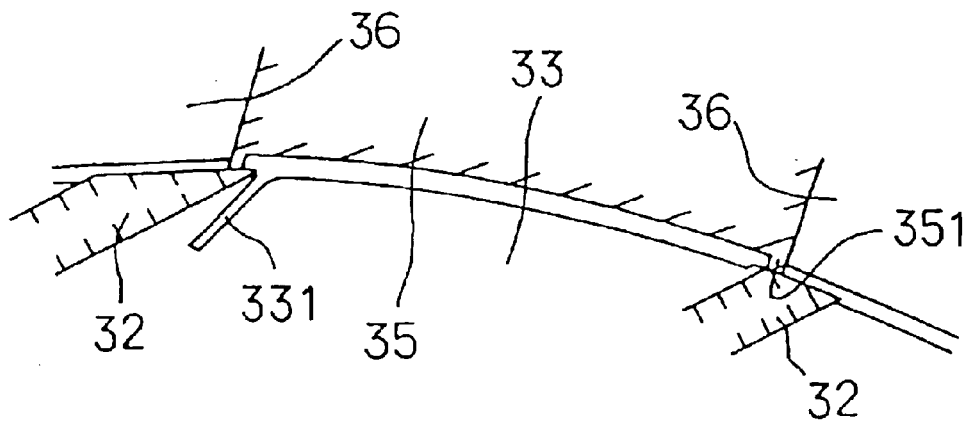
FIGS. 7A to 7C are arrangement plan views of a mold in a process of molding the panel for an airbag according to Embodiment 2.
Figure 7B:
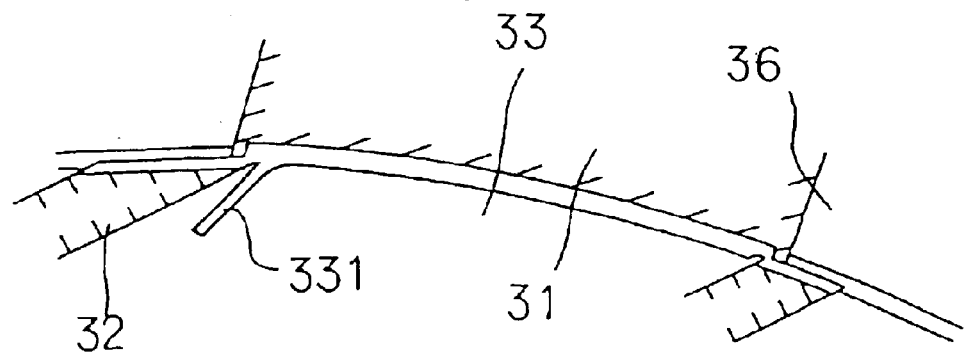
Figure 7C:
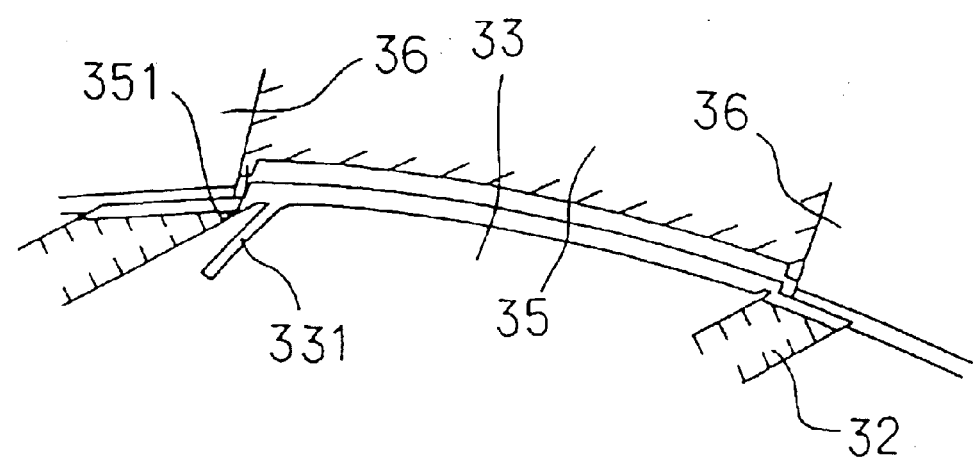

In an injection molding process of the panel, a concave portion 331 is formed in the fixing mold 33, as shown in FIG. 7, so that the rib 25 is formed.

The panel 1 for the airbag in this embodiment is reinforced by the rib 25. A root portion C of the non-thin wall portion 24 having the rib 25 becomes a rotating center of an opening movement of the cover body 20 at its opening time. Namely, when the thin wall portion 23 is ruptured, a ruptured portion formed into a quadrilateral shape with one side opened of the cover body 20 is rotated and opened with a root portion C (FIG. 6) of the rib 25 as a rotating center.

The rib 25 is tightly fixed to the bracket 811 of the airbag case 82 via the connecting member. Accordingly, when the cover body 20 is separated from the main body 10 at the operating time of the airbag 81, the cover body 20 is neither shifted from the airbag case 82 nor is scattered.

The other elements are similar to those of Embodiment 1.

Embodiment 3

Figure 8:
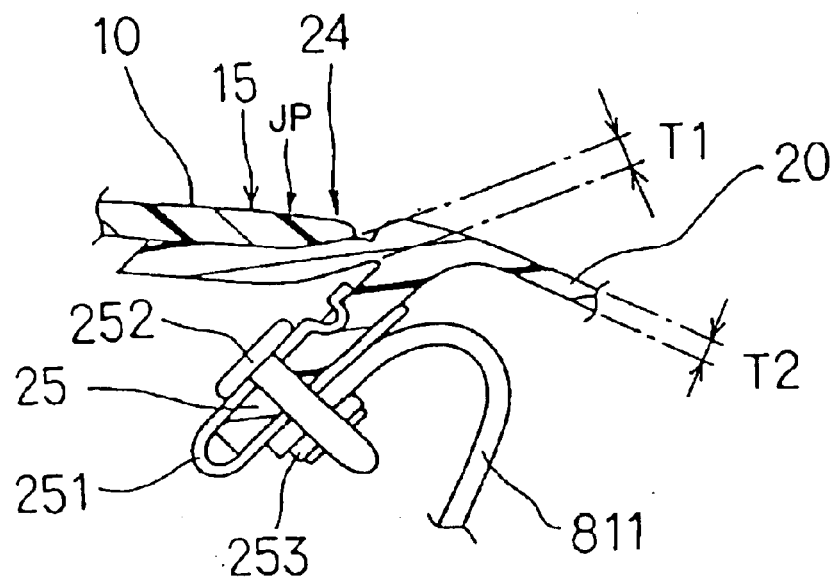
FIG. 8 is an enlarged view of the periphery of a non-thin wall portion according to Embodiment 3.

In this embodiment, as shown in FIG. 8, a minimum thickness T1 of the non-thin wall portion 24 is set to be 1.5 times or more a thickness T2 of the cover body 20 in Embodiment 2.

The minimum thickness T1 is increased, as mentioned above, to reinforce the non-thin wall portion. Accordingly, if the retainer 251 is dislocated from the bracket 811 by the operation of the airbag 81, the non-thin wall portion 24, as a rotating center of the opening movement of the cover body 20, is hardly ruptured. Therefore, it is possible to obtain a panel 1 for the airbag with higher safety.

The other elements are similar to those of Embodiment 2.

Embodiment 4

Figure 9:
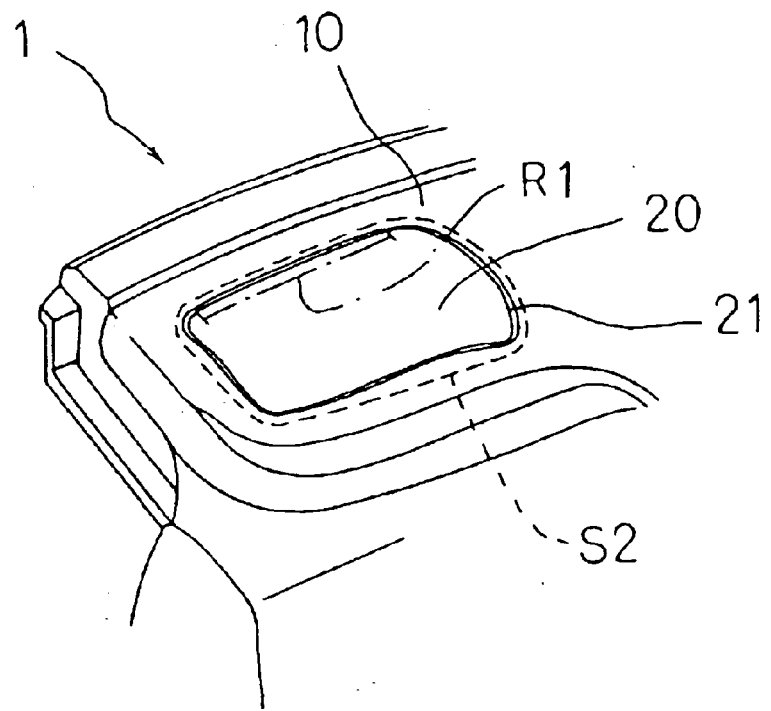
FIG. 9 is a perspective view of panel for an airbag according to Embodiment 4.

In this embodiment, the non-thin wall portion 24 is formed along a transverse line on an upper side of the cover body 20 in Embodiments 2 and 3. Further, as shown in FIG. 9, the thin wall portion 23 is formed along the entire periphery of the groove portion 21 as shown by a closed curve S2 (represented by dashes) such that a line R1 (represented by dot-and-dashes), forming the non-thin wall portion 24, is included in an inner side.

The thin wall portion 23 is formed in a shape of the closed curve S2 (represented by dashes), but no cover body 20 is connected to the airbag case 82 through the rib 25. Accordingly, when the thin wall portion 23, formed on the closed curve S2 (represented by dashes), is entirely ruptured throughout the entire periphery and is separated from the main body 10, the cover body 20 is neither separated nor scattered when the airbag is operated.

In addition, the cover body 20 is separated from the main body 10 by entirely rupturing the thin wall portion 23, formed on the closed curve S2 (represented by dashes), along its entire periphery and this leads to the following advantages. Namely, no tensile stress is applied to the main body 10 by the cover body 20 when the airbag is operated. Accordingly, situations hardly occur in which the main body 10 is damaged by stress caused by operating the airbag and is partially damaged and scattered in a certain case. Therefore, safety of the airbag is greatly improved.

The other elements are similar to those of Embodiments 2 and 3.

Embodiment 5

Figure 10:
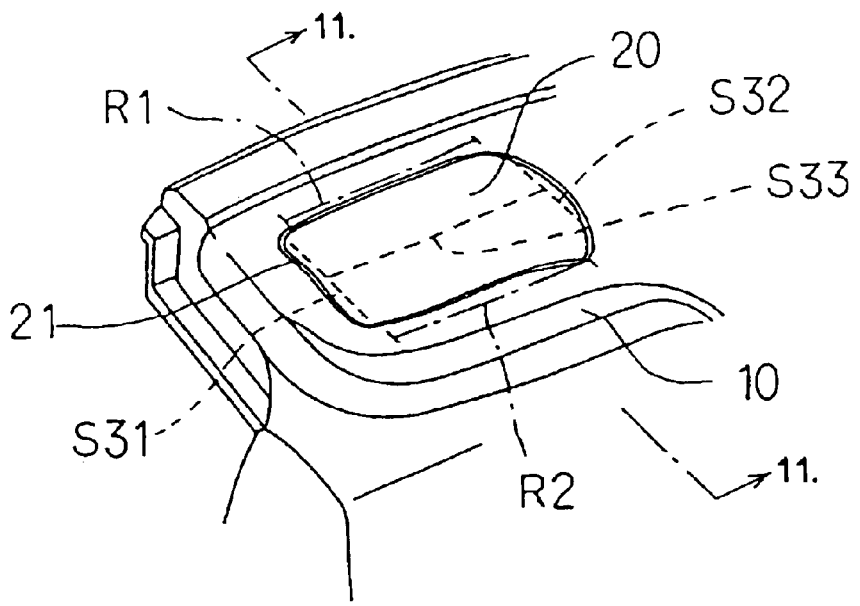
FIG. 10 is a perspective view of an panel for an airbag according to Embodiment 5.
Figure 11:
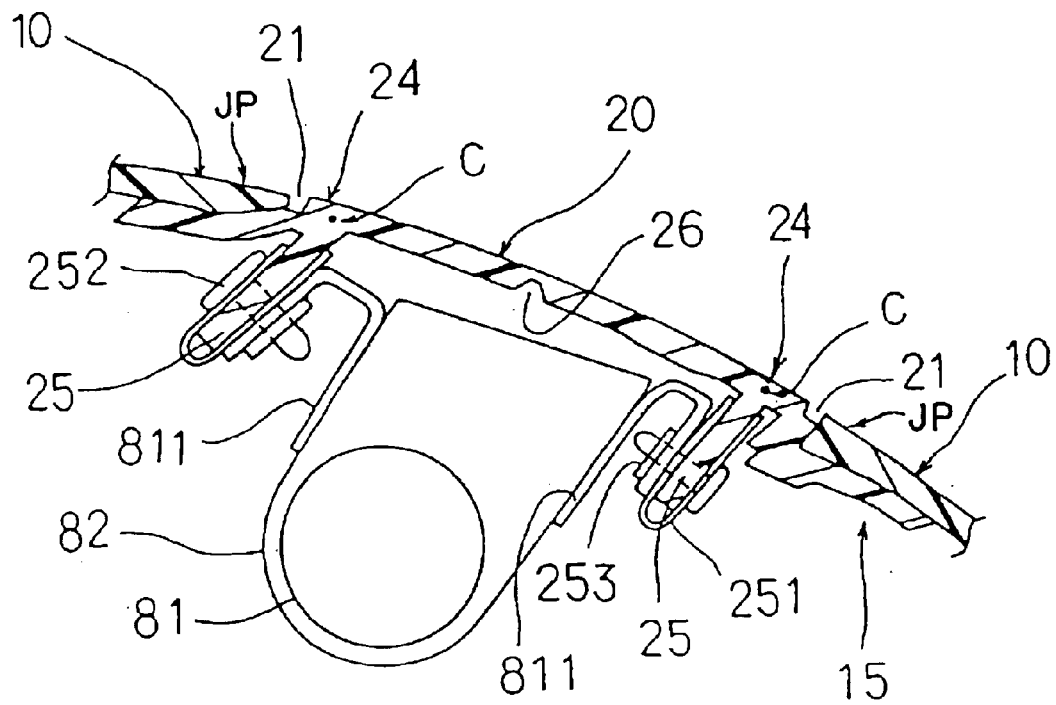
FIG. 11 is a cross-sectional view taken along a line 11—11 of FIG. 10.

In this embodiment, as shown in FIGS. 10 and 11, the non-thin wall portion 24, having the rib 25 in Embodiment 2, is formed along transverse lines R1 and R2 (represented by dots-and-dashes) on upper and lower sides of the cover body 20, respectively. As shown in FIG. 10, the thin wall portion 23 is formed in the shapes of longitudinal lines S31 and S32 (represented by dashes) on the left-hand and the right-hand sides of the cover body 20, respectively. Further, a second thin wall portion 26 (FIG. 11), which is not formed along the groove portion 21, is formed along transverse line S33 (represented by dashes) in a central portion of the cover body 20. The first and second thin wall portions 23 and 26 are entirely formed in an H-shape.

In this embodiment, the central second thin wall portion 26 is ruptured when the airbag is operated. An opening portion of the cover body 20 is easily opened on the left-hand and the right-hand sides in FIG. 11 with the non-thin wall portion 24 formed along the transverse lines R1 and R2 (represented by dot-and-dashes) acting as a rotating center.

The other elements are similar to those of Embodiment 2.

Embodiment 6

Figure 12:
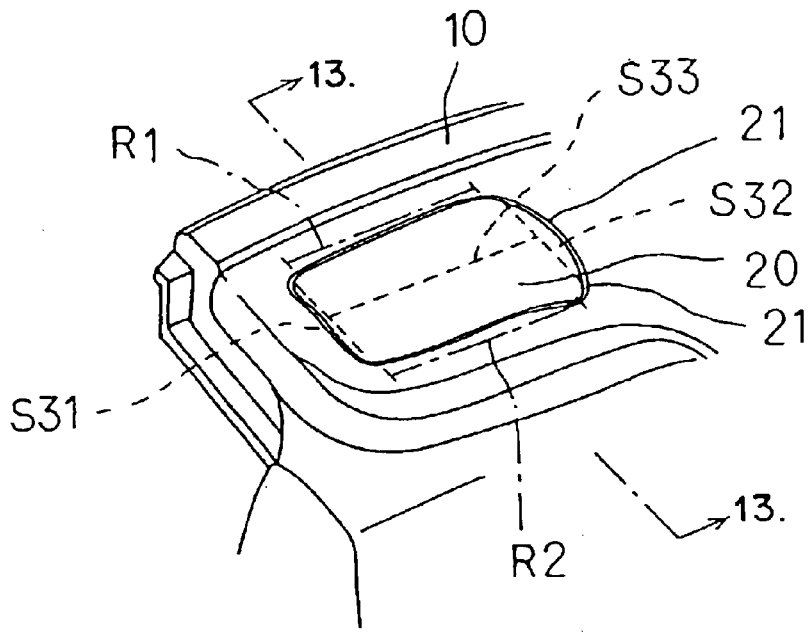
FIG. 12 is a perspective view of a panel for an airbag according to Embodiment 6.
Figure 13:
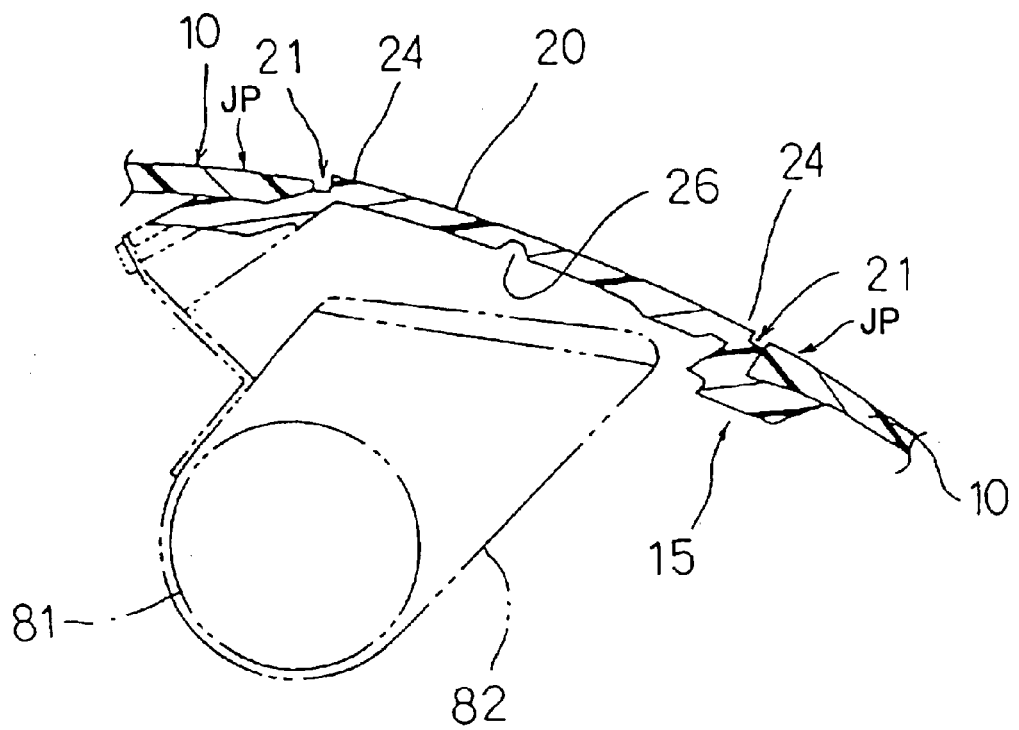
FIG. 13 is a cross-sectional view taken along a line 13—13 of FIG. 12.

In this embodiment as shown in FIGS. 12 and 13, no rib 25 is formed in Embodiment 5.

Since no rib 25 is formed, the airbag can be produced at a lower cost compared with Embodiment 5. However, since no rib 25 is provided, strength or other properties of the airbag are relatively inferior to those in Embodiment 5.

The other elements are similar to those of Embodiment 5.

Embodiment 7

In this embodiment, as shown in FIG. 8, a minimum thickness T1 of the non-thin wall portion 24 is set to be 1.5 times or more a thickness T2 of the cover body 20 in Embodiment 5.

The minimum thickness T1 is increased, as mentioned above, to reinforce the non-thin wall portion. Accordingly, if the retainer 251 is dislocated from the bracket 811 by the operation of the airbag 81, the non-thin wall portion 24, as a rotating center of the opening movement of the cover body 20, is hardly ruptured. Therefore, it is possible to obtain a panel 1 for the airbag with excellent safety.

The other elements are similar to those of Embodiment 5.

Embodiment 8

Figure 14:
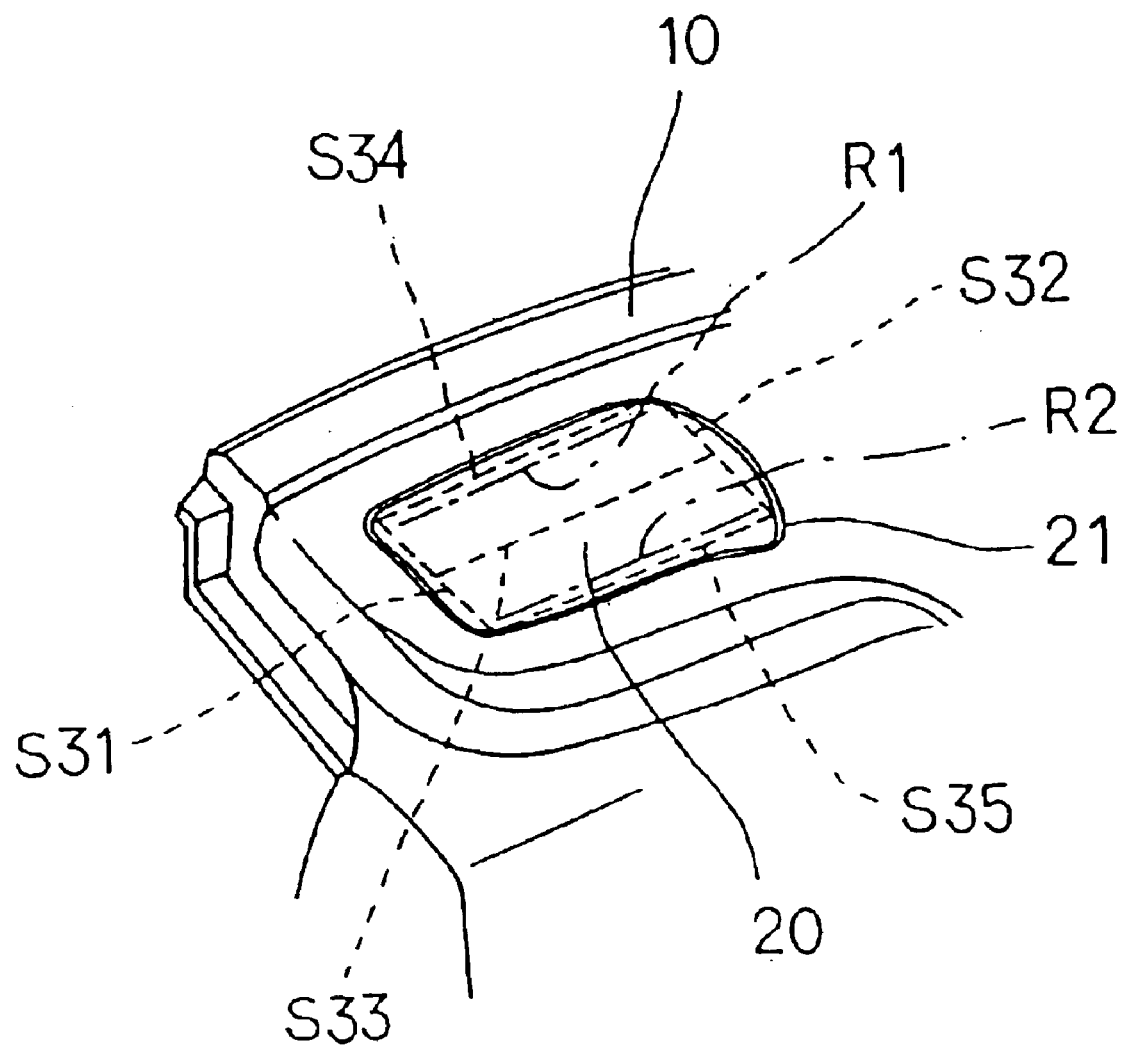
FIG. 14 is a perspective view of a panel for an airbag according to Embodiment 8.

In this embodiment, as shown in FIG. 14, the thin wall portion 23 is formed along transverse lines S34 and S35 (represented by dashes) on upper and lower sides of the cover body 20 in Embodiment 5. The first and second thin wall portions 23 and 26 are entirely formed in a shape in which two quadrilaterals are lined up.

In this embodiment, the thin wall portion 23, formed on a closed curve (see longitudinal lines S31 and S32 and transverse lines S33, S34, and S35 all represented by dashes), is entirely ruptured throughout the entire periphery so that the cover body 20 is separated from the main body 10 at the operating time of the airbag.

As a result, no tensile stress from the cover body 20 is applied to the main body 10 at the operating time of the airbag. Accordingly, situations hardly occur in which the main body 10 is damaged by stress caused by operating the airbag and is partially damaged and scattered in a certain case. Therefore, safety of the airbag is improved.

The other elements are similar to those of Embodiment 5.

Embodiment 9

Figure 15:
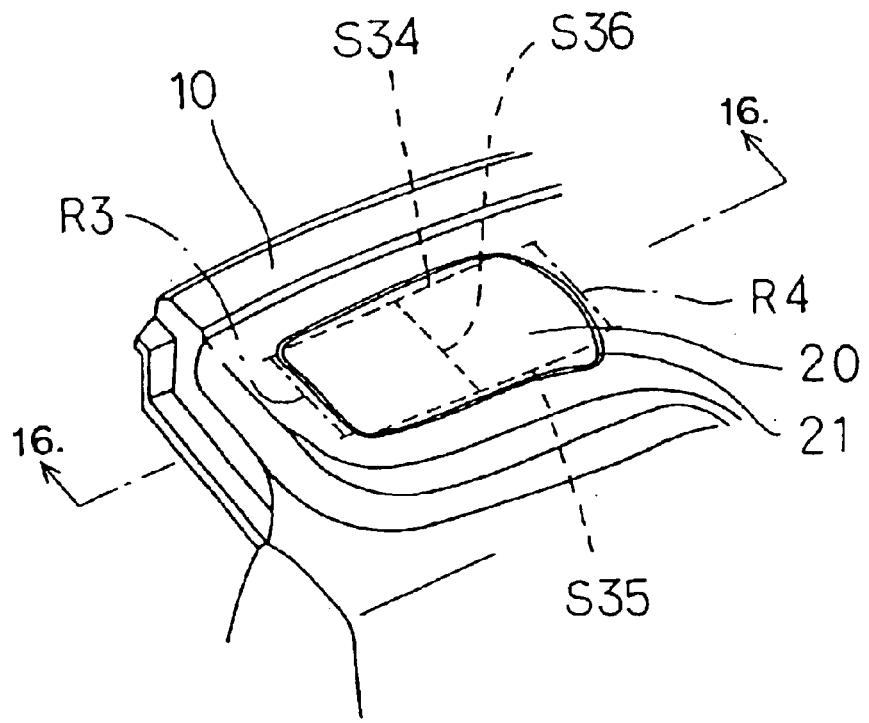
FIG. 15 is a perspective view of a panel for an airbag according to Embodiment 9.
Figure 16:
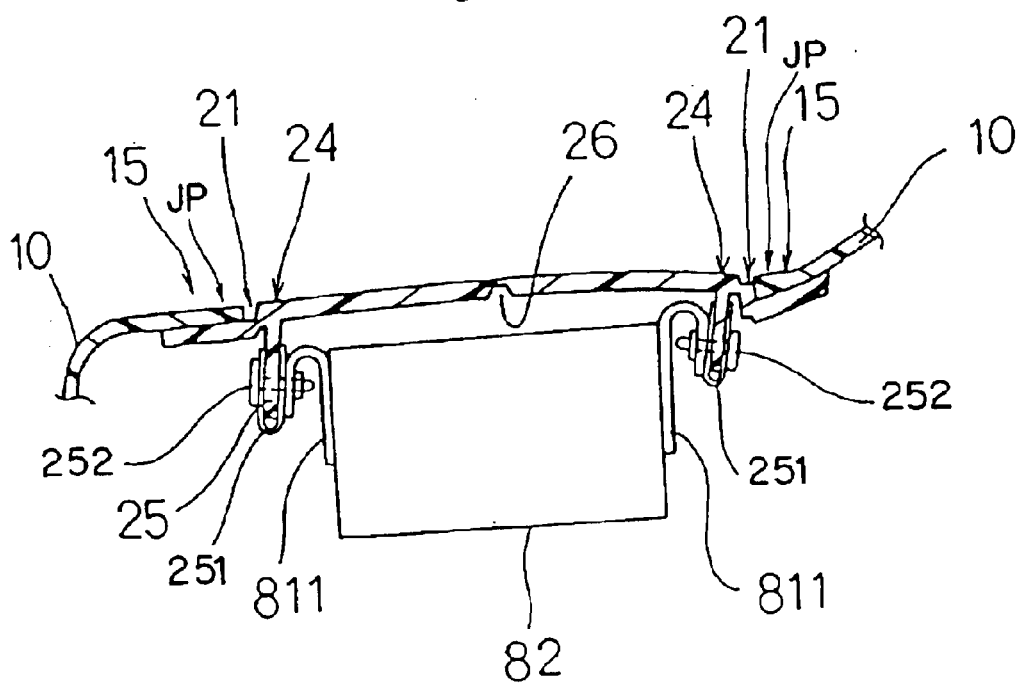
FIG. 16 is a cross-sectional view taken along a line 16—16 of FIG. 15.

In this embodiment, as shown in FIGS. 15 and 16, the non-thin wall portion 24 in Embodiment 2 is formed along longitudinal lines R3 and R4 (represented by dot-and-dashes) on the left-hand and the right-hand sides of the cover body 20, respectively. The thin wall portion 23 is formed along transvere lines S34 and S35 (represented by dashes) on upper and lower sides of the cover body 20, respectively. Further, a second thin wall portion 26, which is not formed along the groove portion 21, is formed along longitudinal line S36 (represented by dashes) in a central portion of the cover body 20. The first and second thin wall portions 23 and 26 are entirely formed in an H-shape.

In this embodiment, the central second thin wall portion 26 is ruptured when the airbag is operated. An opening portion of the cover body 20 is easily opened on the left-hand and the right-hand sides in FIG. 11 with the non-thin wall portion 24 as a rotating center.

The other elements are similar to those of Embodiment 2.

Embodiment 10

In this embodiment, no rib 25 is formed in Embodiment 9.

Since no rib 25 is formed, the airbag can be produced at a lower cost compared with Embodiment 9. However, since no rib 25 is provided, strength or other properties of the airbag are relatively inferior to those in an airbag with the rib.

The other elements are similar to those of Embodiment 9.

Embodiment 11

In this embodiment, as shown in FIG. 8, a minimum thickness T1 of the non-thin wall portion 24 is set to be 1.5 times or more a thickness T2 of the cover body 20 in Embodiment 9.

The minimum thickness T1 is increased, as mentioned above, to reinforce the non-thin wall portion. Accordingly, if the retainer 251 is dislocated from the bracket 811 by the operation of the airbag 81, the non-thin wall portion 24, as a rotating center of the opening movement of the cover body 20, is hardly ruptured. Therefore, it is possible to obtain a panel 1 for the airbag with excellent safety.

The other elements are similar to those of Embodiment 9.

Embodiment 12

Figure 17:
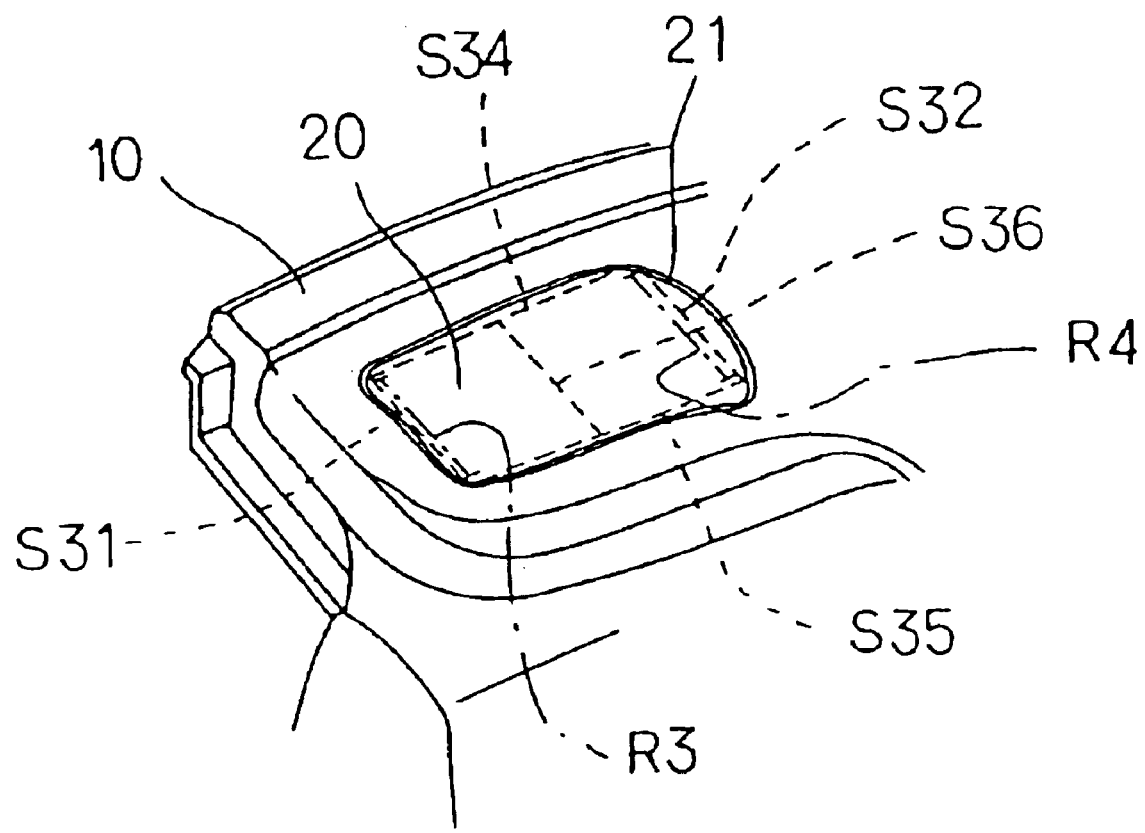
FIG. 17 is an enlarged view of the periphery of a thin wall portion of a panel for an airbag according to Embodiment 12.

In this embodiment, as shown in FIG. 17, the thin wall portion 23 is formed along longitudinal lines S31 and S32 (represented by dashes) on the right-hand and the left-hand sides of the cover body 20 in Embodiment 9. The first and second thin wall portions 23 and 26 are entirely formed in a shape in which two quadrilaterals are lined up.

In this embodiment, the thin wall portion 23 formed on a closed curve is entirely ruptured throughout the entire periphery so that the cover body 20 is separated from the main body 10 at the operating time of the airbag.

As a result, tensile stress from the cover body 20 does not act to the main body 10 at the operating time of the airbag. Accordingly, danger hardly occurs that the main body 10 is damaged by stress caused by operating the airbag and is partially damaged and scattered in a certain case. Therefore, safety of the airbag is improved.

The other elements are similar to those in Embodiment 9.

Embodiment 13

Figure 18:
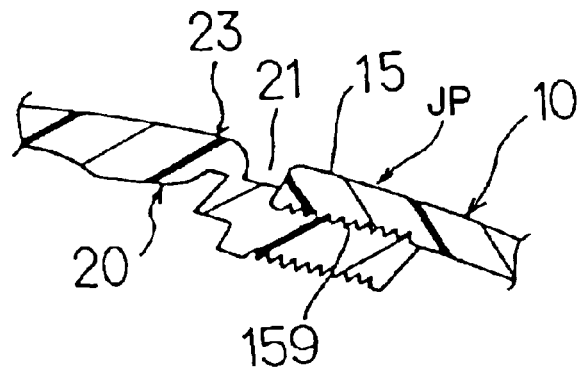
FIG. 18 is an enlarged view of the periphery of a thin wall portion of a panel for an airbag according to Embodiment 13.

In this embodiment, as shown in FIG. 18, a concavo-convex portion 159 is formed in a sawtooth shape on a lower face of the main body 10 in an overlapping portion 15.

This concavo-convex portion 159 is formed in a non-thin wall portion 24 as well as in the thin wall portion 23.

This concavo-convex portion 159 is formed by using a core 32, imparted a concavo-convex shape, which is used in molding and then, molding the main body 10 and the cover body 20 by two-color molding by using this core 32 similarly to Embodiment 1.

The thin wall portion 23 has 0.8 mm in thickness.

The other elements are similar to those of Embodiment 1.

In this embodiment, the concavo-convex portion 159, having the sawtooth shape, is formed in the overlapping portion 15 of the main body 10. Therefore, both the members are tightly joined because of an anchor effect of the cover body 20 in this concavo-convex portion 159. Accordingly, the cover body 20 is neither dislocated from the main body 10, nor scattered when the airbag is operated.

In this embodiment, effects similar to those of Embodiment 1 can be also obtained.

Embodiment 14

Figure 19:
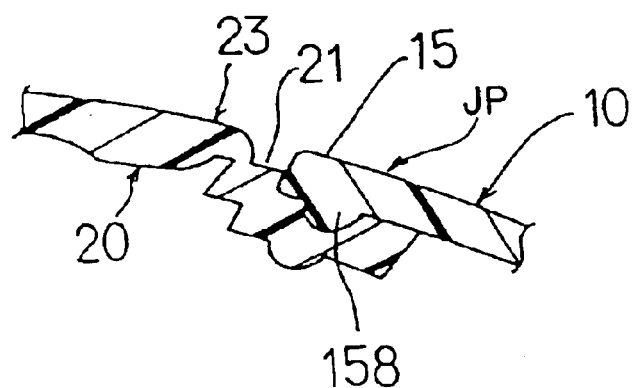
FIG. 19 is an enlarged view of the periphery of a thin wall portion of a panel for an airbag according to Embodiment 14.

In this embodiment, as shown in FIG. 19, a concavo-convex portion 158 is formed in a downwardly convex shape on a lower face of the main body 10 in an overlapping portion 15.

The other elements are similar to those of Embodiment 13.

In this embodiment, similarly to the Embodiment 13, the anchor effect is improved by the concavo-convex portion 158 in the overlapping portion 15 so that joining strength of the cover body 20 to the main body 10 is improved.

In this embodiment, effects similar to those of Embodiment 1 can be also obtained.

Embodiment 15

Figure 20:
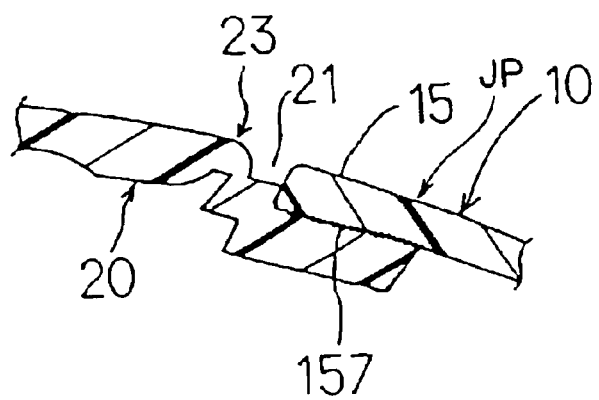
FIG. 20 is a perspective view of a panel for an airbag according to Embodiment 15.

As shown in FIG. 20, a panel for an airbag in this embodiment has a melt-bonded portion 157 formed in an overlapping portion 15, such that the main body 10 and the cover body 20 are joined by high frequency induction heating or vibrational melt-bonding.

The other elements are similar to those of Embodiment 13.

In this embodiment, the melt-bonded portion 157 is formed by joining both the main body 10 and the cover body 20 by the high frequency induction heating or the vibrational melt-bonding. Therefore, joining strength of both the members is improved.

In this embodiment, effects similar to those in the Embodiment 13 can be also obtained.

Embodiment 16

Figure 21:
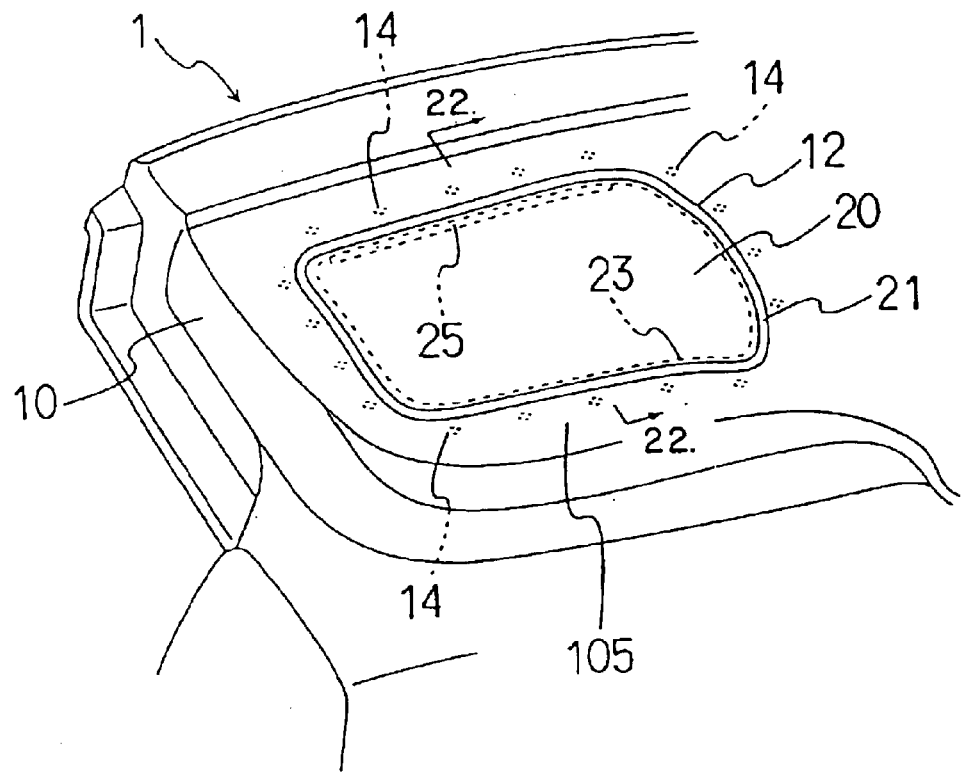
FIG. 21 is a perspective view of a panel for an airbag according to Embodiment 16.
Figure 22:
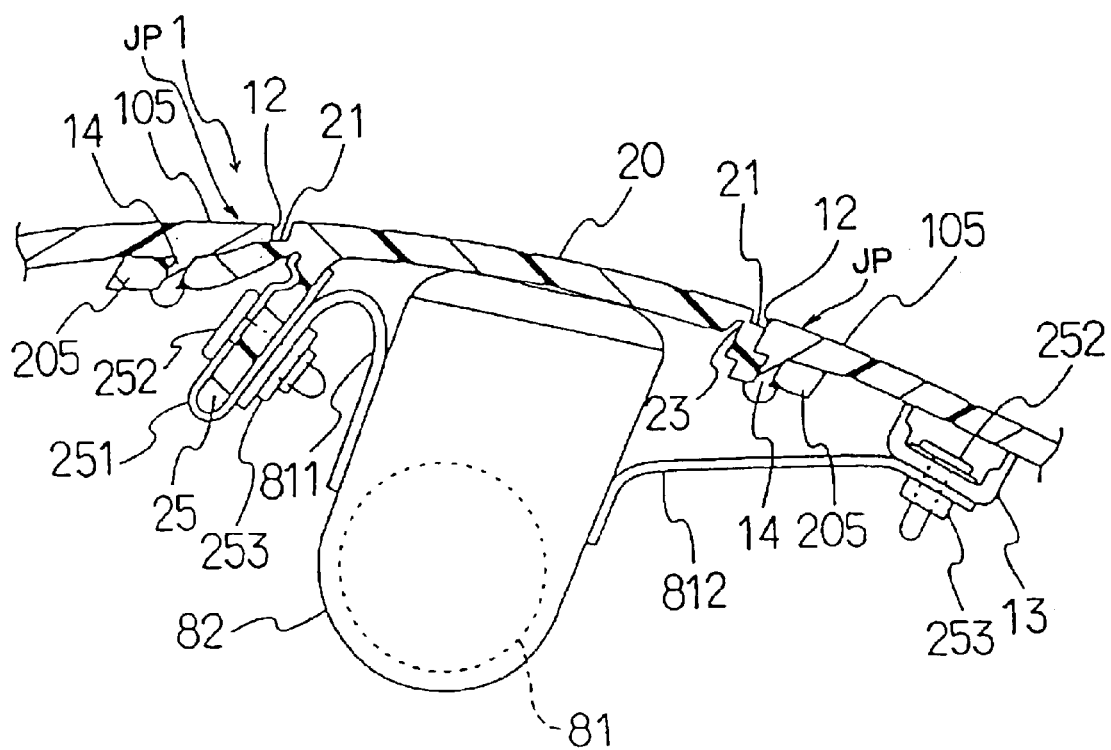
FIG. 22 is a cross-sectional view taken along a line 22—22 of FIG. 21.

FIG. 21 shows an enlarged perspective view of a forward passenger seat side part of an instrument panel, as an example of the panel 1 for an airbag. The instrument panel is formed by a hard synthetic resin material, such as polypropylene (PP), mixed with rubber and a filler. An opening portion 12, for example, an airbag swelling-out port having a substantially rectangular shape, is formed on an upper face of a main body 10 of this instrument panel in its central position in a back and forth direction (a slanting vertical direction in FIG. 21) of the main body 10. This opening portion 12 is closed by a cover body 20, molded by two-color molding described later and constructed by a PC (polycarbonate)/ABS(acrylonitrile butadiene styrene) alloy incompatible with PP. FIG. 22 shows a cross section of this opening portion 12.

In FIG. 22, an outer peripheral edge 205 of the cover body 20 is bent along the lower face of an opening edge 105 of the opening portion 12 of the main body 10, and is caulked and fixed by bosses 14 projected on this lower face. Namely, as shown in FIG. 21, many bosses 14 are spaced from each other on the lower face of the opening edge 105 of the main body 10 and are formed in a peripheral shape. These bosses 14 extend downwardly through the outer peripheral edge 205 of the cover body 20, and their end tips are crushed by heat so that a caulking state is formed. Thus, the cover body 20 is tightly connected to the main body 10.

An outer peripheral surface of the cover body 20 has a step portion, with an upper surface lower than an upper surface of the main portion of the cover body 20, so that a groove portion 21 is formed in a concave shape between this outer peripheral surface and an opening peripheral face of the opening portion 12. A rib 25 is formed on a rear face of the cover body 20 on its front side (a left-hand side of the cover body 20 in FIG. 22). This rib 25 is formed in the shape of a straight line along this rear face of the cover body 20 and is projected slantingly forward. This rib 25 is covered with a metallic retainer 251. The rib 25 is connected to a bracket 811 located behind the cover body 20 by a bolt 252 and a nut 253. An airbag case 82, storing an airbag 81 therein, is fixed by the bolt 252 and the nut 253 to an insert material 13 of the main body 10 with the bracket 812.

The rear face of the cover body 20 along its three sides, except for the front side, is deeply recessed towards the surface, and a thin wall portion 23, to be ruptured when the airbag 81 inflates, is formed between this rear face and the groove portion 21 having a concave shape. Accordingly, when the airbag 81 inflates, the thin wall portion 23, (represented by dashes in FIG. 21) on the three sides of the cover body 20, is ruptured so that the cover body 20 is opened into a cabin (on an upper side in FIG. 2) with a portion near a root of the rib 25 as a hinge center and the airbag 81 swells out of the opening portion 12 at the time of operation of the airbag 81.

Figure 23:
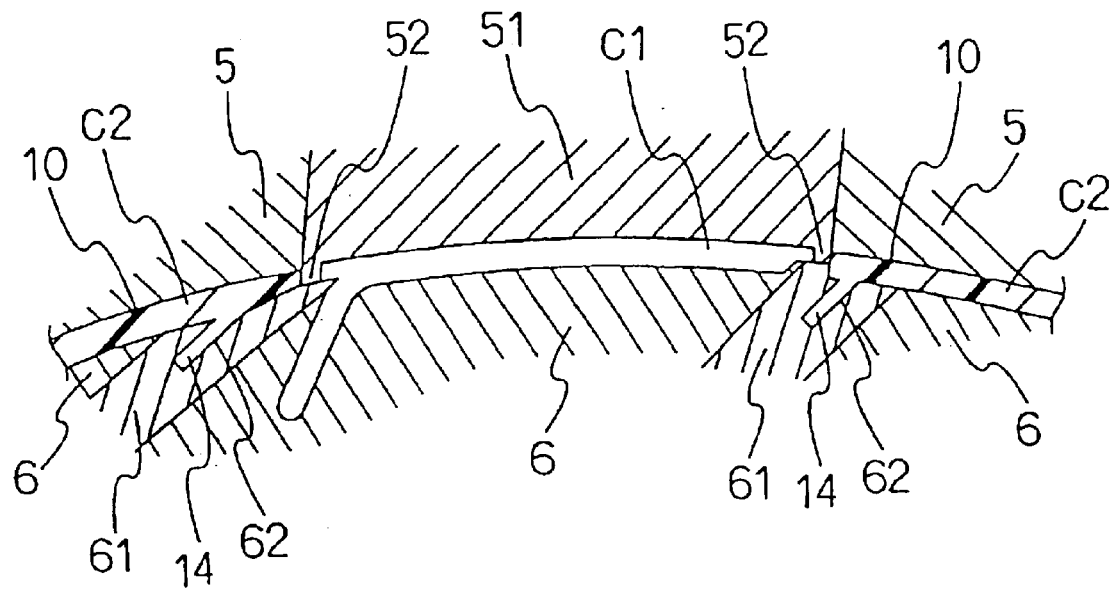
FIG. 23 is a cross-sectional view of a mold in molding the panel for an airbag according to Embodiment 16.

Such a panel 1 for the airbag 81 is produced by two-color molding explained below. Namely, in FIG. 23, a convex strip 52, having the same shape as the groove portion 21 having the concave shape, is formed in a slide type opposite mold 51 within an upper mold 5 in an outer periphery of its molding face. An end face of a slide core 61 within a lower mold 6 comes into press contact with an end face of this convex strip 52, and a cover body molding cavity C1 and a main body molding cavity C2, outside this cavity C1, are separated from each other. Further, many columnar concave portions 62 are spaced from each other in a peripheral shape on an end face of the slide core 61 and extend to the interior of the slide core 61 at a constant depth. These concave portions 62 communicate with the main body molding cavity C2. A polypropylene (PP) material is injected into such a main body molding cavity C2 so that the main body 10 is molded. At this time, the polypropylene (PP) material is simultaneously supplied into each of the concave portions 62 so that the above-mentioned bosses 14 are molded.

Figure 24:
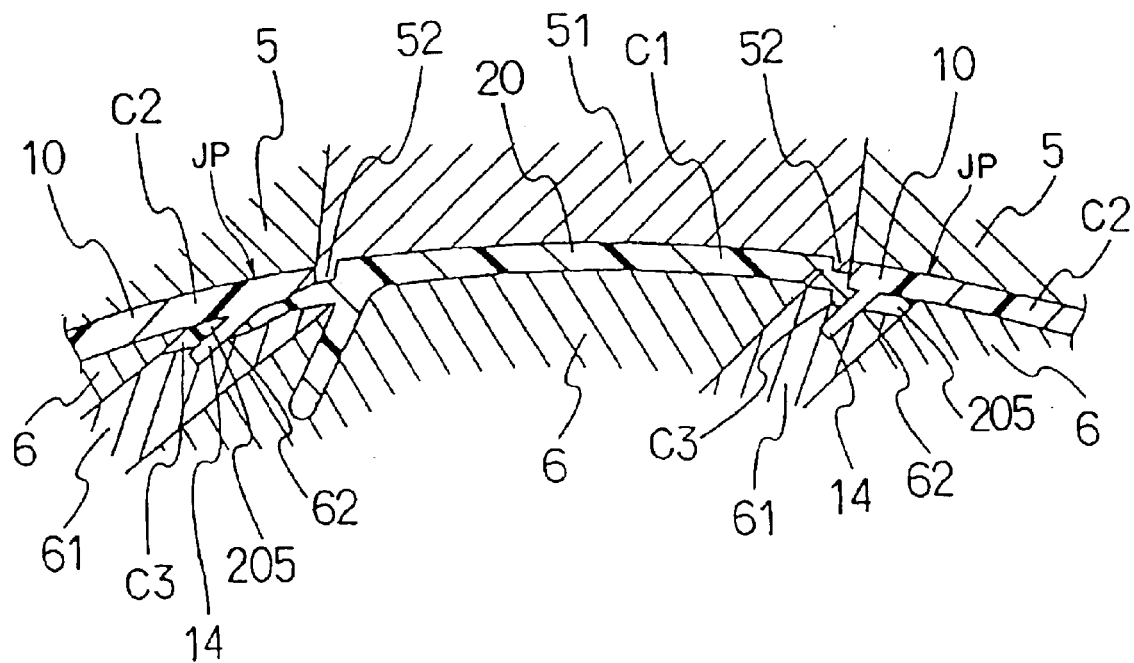
FIG. 24 is a cross-sectional view of a mold in molding a cover body according to Embodiment 16.

While the hard synthetic resin material within the main body molding cavity C2 is yet in a semisolid state, the slide core 61 is subsequently retreated by a constant amount, as shown in FIG. 24, and the main body molding cavity C2 and the cover body molding cavity C1 communicate with each other. In this state, a PC/ABS alloy material, incompatible with the polypropylene (PP) material, is injected into the cover body molding cavity C1. The cover body molding cavity C1 is filled with the PC/ABS alloy material. This PC/ABS alloy material also enters a clearance cavity C3 yielded by retreating the slide core 61 and becomes an outer peripheral edge 205 of the cover body 20 so that it fills peripheral portions of the bosses 14. The PC/ABS alloy material is taken out of the mold in this state, and end tips of the bosses 14, projected from the lower face of the opening edge 105 of the opening portion 12 (FIG. 22) of the main body 10, are crushed and caulked by heat.

Embodiment 17

Figure 25:
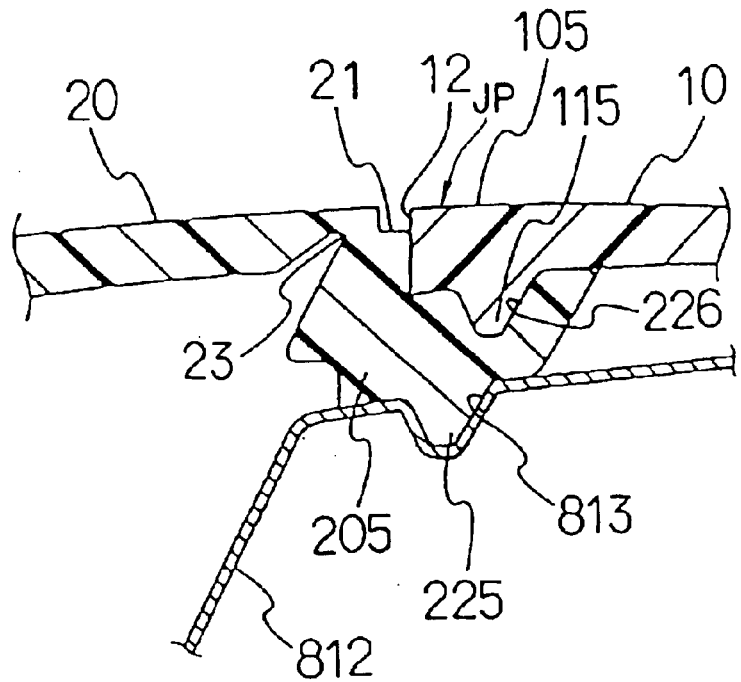
FIG. 25 is a cross-sectional view of the periphery of a cover body according to Embodiment 17.

FIG. 25 shows another example of a connecting structure of the main body 10 and the outer peripheral edge 205 of the cover body 20. In this figure, a convex strip 115, having an angular cross-section, is formed on the lower face of the opening edge 105 of the opening portion 12 of the main body 10 in its entire periphery. In contrast to this, a concave groove 226 is formed on an upper face of the outer peripheral edge 205 of the cover body 20, which is integrally molded by two-color molding with the main body 10. The convex strip 115 is fitted into this concave groove 226. A convex strip 225, having the same cross-section as the convex strip 115, is formed on a lower face of the outer peripheral edge 205 of the cover body 20 in accordance with a shape of the slide core at a two-color molding time. This convex strip 225 is fitted into a concave groove 813, which has been flex-formed in a bracket 812 of the airbag case 82 (FIG. 2). Thus, the cover body 20 is supported between the main body 10 and the bracket 812 in a state in which the concave groove 226 and the convex strip 225 of the cover body 20 are fitted into the convex strip 115 of the main body 10 and the concave groove 813 of the bracket 812, respectively. In this manner, the cover body 20 is connected to the main body 10.

Embodiment 18

Figure 26:
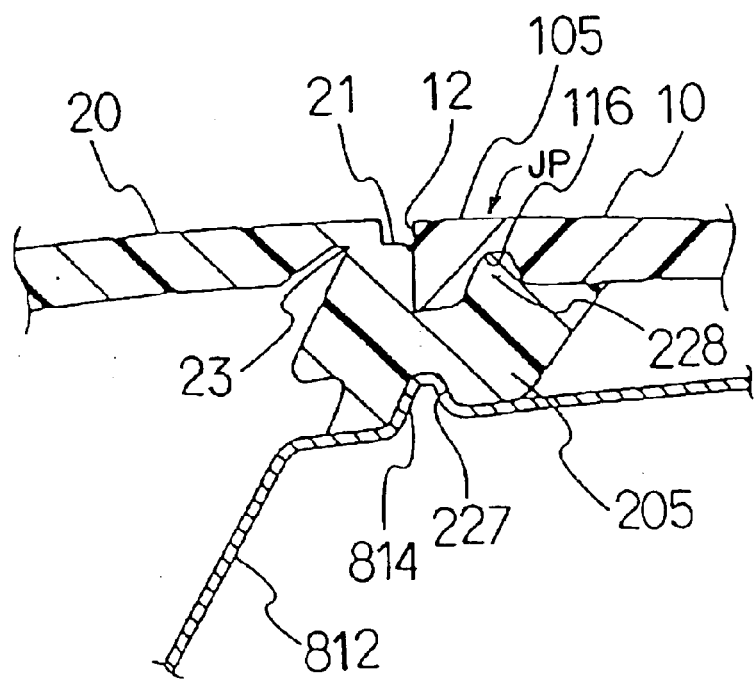
FIG. 26 is a cross-sectional view of the periphery of a cover body according to Embodiment 18.

FIG. 26 shows even another example of the connecting structure of the main body 10 and the outer peripheral edge 205 of the cover body 20. In this figure, a concave groove 116, having an angular cross section, is formed on a lower face of the opening edge 105 of the opening portion 12 of the main body 10 in its entire periphery. In contrast to this, a convex strip 228 is formed on an upper face of the outer peripheral edge 205 of the cover body 20, which is integrally molded by two-color molding with the main body 10, and which is fitted to the concave groove 116. Further, a concave groove 227, having the same cross-section as the concave groove 116, is formed on a lower face of the outer peripheral edge 205 of the cover body 20 in accordance with a shape of the slide core for two-color molding. This concave groove 227 is fitted into a convex strip 814, which has been flex-formed in the bracket 812 of the airbag case 82 (FIG. 2). Thus, the cover body 20 is supported between the main body 10 and the bracket 812 in a state in which the convex strip 228 and the concave groove 227 of the cover body 20 are fitted into the concave groove 116 of the main body 10 and the convex strip 814 of the bracket 812, respectively. Accordingly, the cover body 20 is connected to the main body 10.

Embodiment 19

The main body 10 and the cover body 20 are not necessarily molded by the two-color molding. For example, it is possible to adopt a method for molding the cover body 20, with the main body 10 molded in advance as an insert, or a method in which the main body 10 and the cover body 20 are individually molded and assembled. In cases using these methods, a combination of convex strips 115 and 225 and concave grooves 226, 813, in FIG. 25, in Embodiment 17, or a combination of convex strips 228 and 814 and concave grooves 116 and 227, in FIG. 26, in Embodiment 18, can be set to only a combination of either of the projecting stripes and either of the concave grooves. Further, the cross-sectional shape of each of these convex strips and concave grooves is not limited to that in each of the embodiments. The bosses 14, in Embodiment 16, are not necessarily formed in a columnar shape, but can be formed in a square pillar shape, a wall shape or the like. Further, the bosses may be also arranged on a side of the cover body 20.

Embodiment 20

Figure 27:
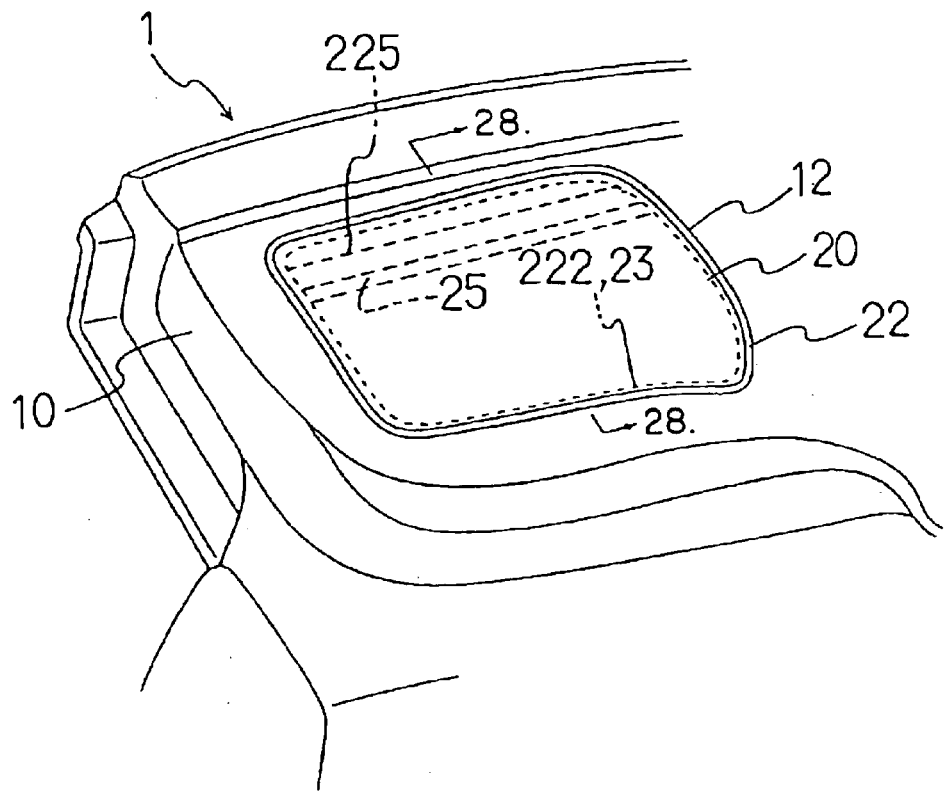
FIG. 27 is a perspective view of a panel for an airbag according to Embodiment 20.

FIG. 27 shows an enlarged perspective view of a forward passenger seat side part of an instrument panel as an example of the panel 1 for an airbag. The instrument panel is constructed by polypropylene (PP), as a thermoplastic hard synthetic resin material, mixed with rubber and a filler. An opening portion 12 is formed in a substantially rectangular shape on an upper face of a main body 10 of this instrument panel in its central position in a back and forth direction (a slanting vertical direction in FIG. 27). This opening portion 12 is closed by a cover body 20, constructed by olefin thermoplastic elastomer (TPO) integrally molded by two-color molding described later. A cross-section of this opening portion 12 is shown in FIG. 28.

Figure 28:
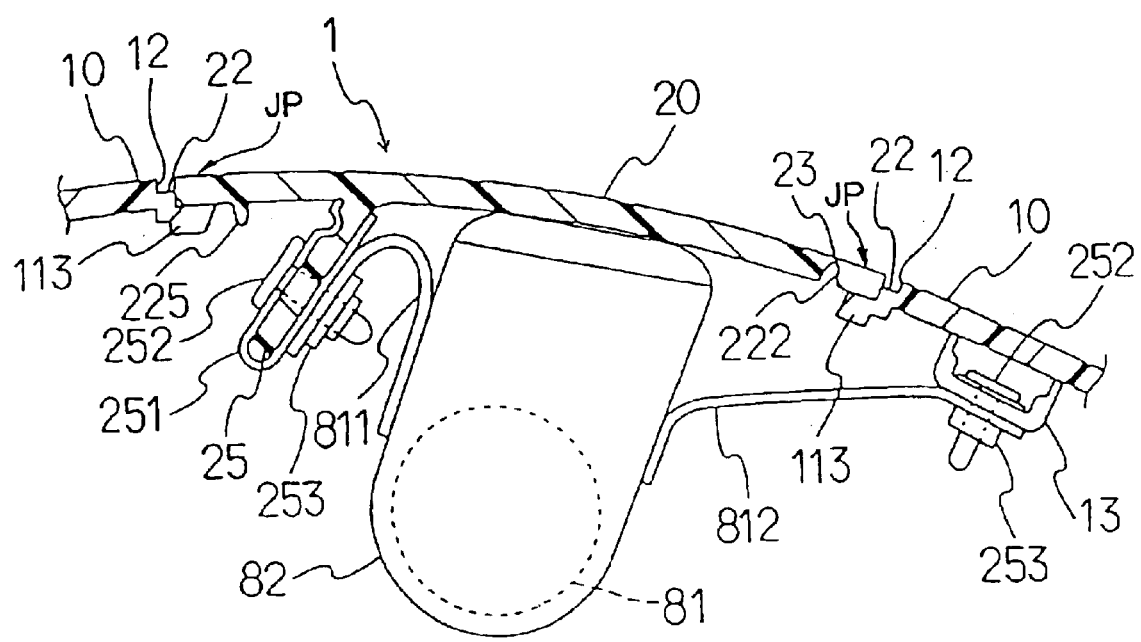
FIG. 28 is a cross-sectional view taken along a line 28—28 of FIG. 27.

In FIG. 28, a peripheral edge 113 of the opening portion of the main body 10 is bent along a lower face of an outer peripheral edge of the cover body 20, and this outer peripheral edge and the peripheral edge 113 are melt-bonded to each other. A surface of the peripheral edge 113 of the opening portion of the main body 10 is stepwise lowered in its entire periphery so that a groove portion 22, having a concave shape, is formed between this surface and an outer peripheral face of the cover body 20. A rib 25 is formed on a rear face of the cover body 20 on its inner side near a front side (a left-hand side in FIG. 28) of the cover body 20. The rib 25 extends in a straight line shape along the front side of the cover body 20 and is projected slantingly forward (leftward in FIG. 28). This rib 25 is covered with a metallic retainer 251 and is connected to a bracket 811 of an airbag case 82 located behind the cover body 20 by a bolt 252 and a nut 253. The airbag case 82, which stores the airbag 81, is connected to an insert material 13 of the main body 10 by the bolt 252 and the nut 253 with the bracket 812.

A concave groove 222 is formed on the rear face of the cover body 20 along its three sides and is deeply recessed in an angular cross-section towards the surface. A thin wall portion 23, which ruptures at an inflating time of the airbag, is formed between the concave groove 222 and a cover surface. A convex strip 225, having an angular cross-section and continuously connected to the concave groove 222, is formed along the remaining one side (the front side) of the cover body 20 from both end portions of the rib 25. This convex strip 225 constitutes a deformation restricting portion in two-color molding described later. When the airbag inflates, the thin wall portion 23 (FIG. 27) is ruptured along three sides of the cover body 20, and the cover body 20 is opened into a cabin (upward in FIG. 28) with a portion near a root of the rib 25 as a hinge center so that the airbag swells out of the opening portion 12.

Figure 29:
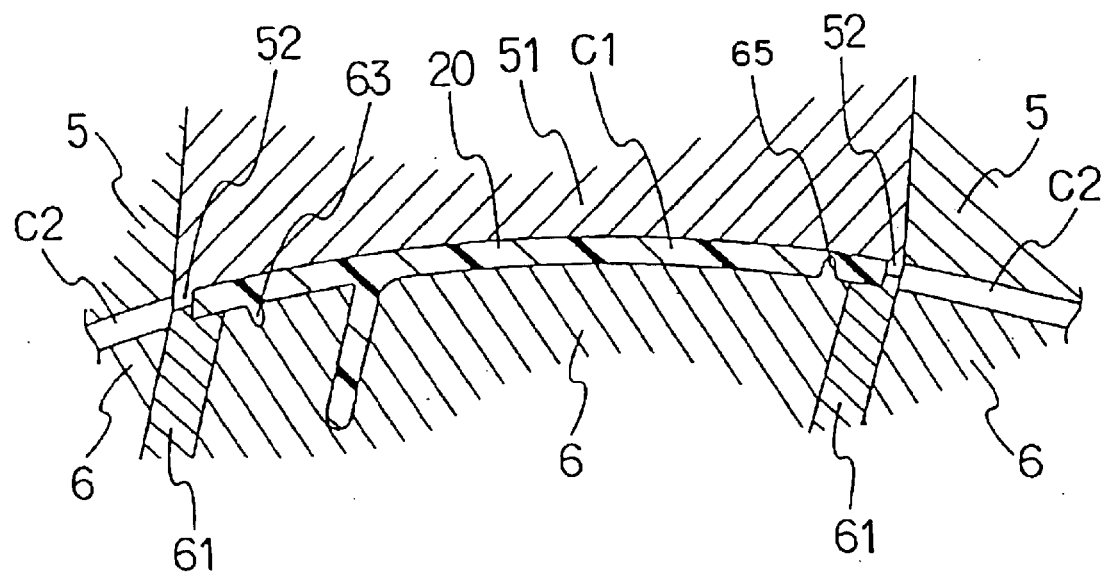
FIG. 29 is a cross-sectional view of a mold in molding a cover body according to Embodiment 20.

Such a panel 1 for the airbag is produced by two-color molding explained below. Namely, in FIG. 29, a convex strip 52, having the same shape as the concave groove portion 22, is formed in a slide type opposite mold 51 within an upper mold 5 in its molding face outer periphery. An end face of a slide core 61, within a lower mold 6, comes into press contact with an end face of this convex strip 52, and a cover body molding cavity C1 and a main body molding cavity C2, outside this cover body molding cavity C1, are separated from each other. A convex strip 65, having an angular cross-section, and a concave groove 63, having an angular cross-section and continuously connected to this convex strip 65, are formed on a molding face of the lower mold 6 along an inner side of the slide core 61. An olefin thermoplastic elastomer (TPO) material is injected into this cover body molding cavity C1 so that the cover body 20 is molded.

The concave groove 222 (FIG. 28) is molded by the convex strip 65 on the rear face of the cover body 20. Further, a convex strip 225 (FIG. 28) is molded by the concave groove 63.

Figure 30:
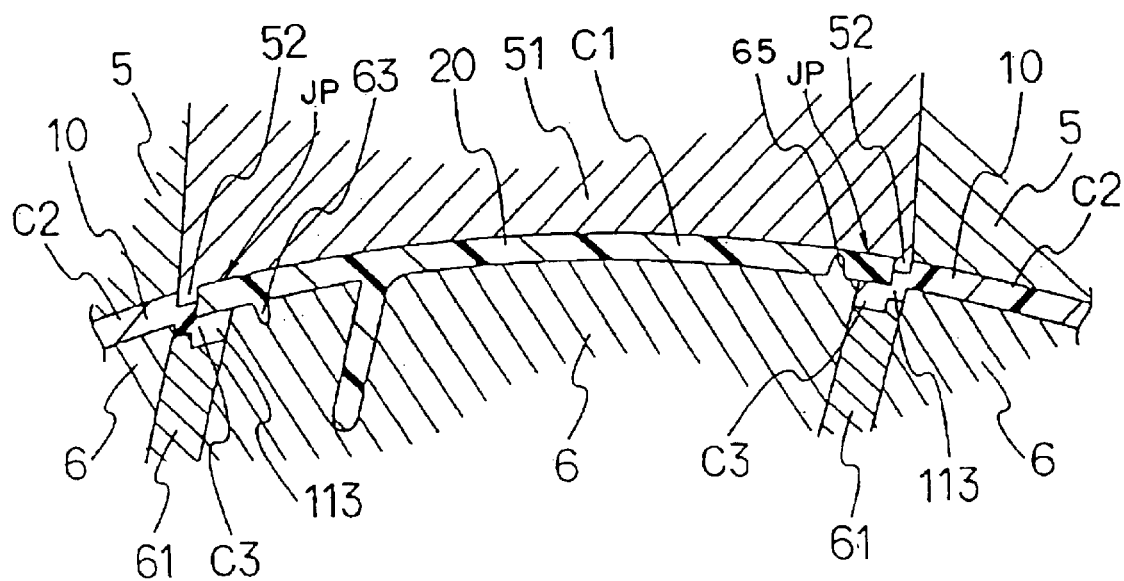
FIG. 30 is a cross-sectional view of a mold in molding the panel for an airbag according to Embodiment 20.

While the olefin thermoplastic elastomer (TPO) material within the cover body molding cavity C1 is yet in a semisolid state, the slide core 61 is subsequently retreated by a constant amount as shown in FIG. 30, and the cover body molding cavity C1 and the main body molding cavity C2 communicate with each other. In this state, a polypropylene (PP) material, compatible with the olefin thermoplastic elastomer (TPO) material, is injected into the main body molding cavity C2. The main body molding cavity C2 is filled with the polypropylene (PP) material and this polypropylene (PP) material also enters a clearance cavity C3 formed by retreating the slide core 61 and becomes a peripheral edge 113 of an airbag swelling-out port of the main body 10. The polypropylene (PP) material is then melt-bonded to an outer peripheral lower face of the cover body 20 in the semisolid state.

Figure 31:
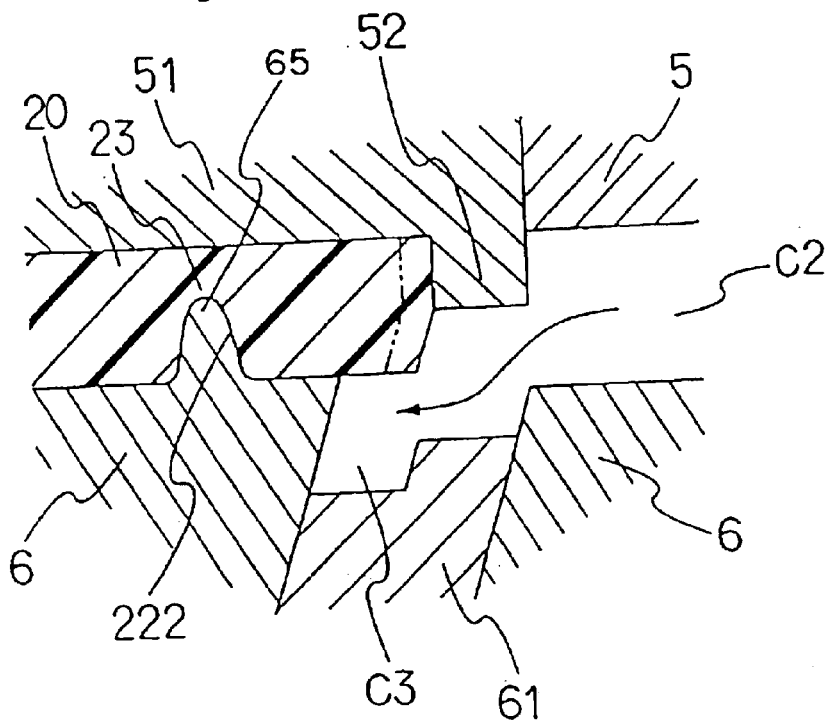
FIG. 31 is a cross-sectional view of a substantial part of the mold in molding the panel for an airbag according to Embodiment 20.
Figure 32:
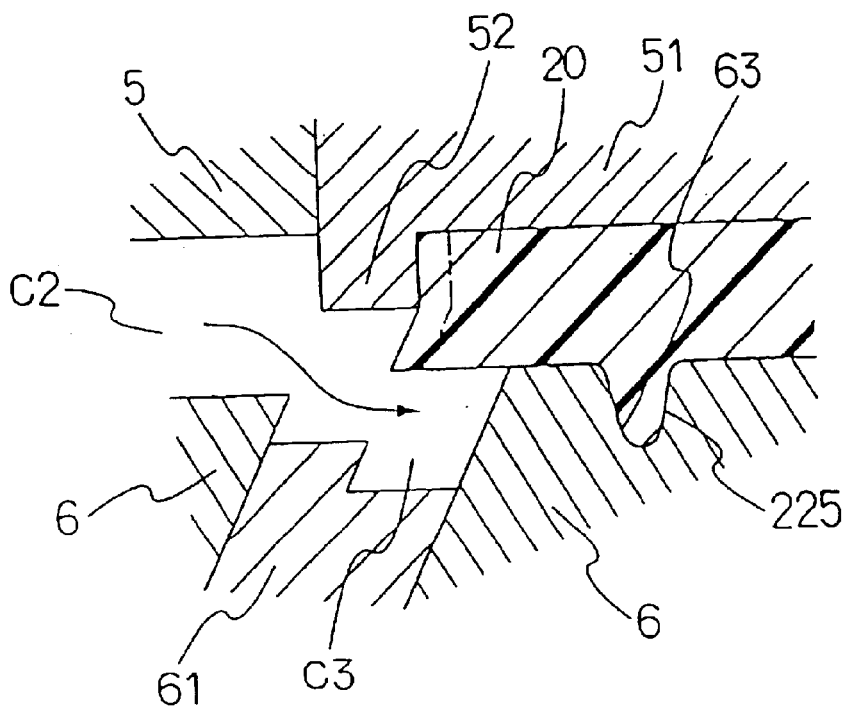
FIG. 32 is a cross-sectional view of a substantial part of the mold in molding the panel for an airbag according to Embodiment 20.

As shown in FIGS. 31 and 32, a large injecting pressure is applied to the cover body 20 in the semisolid state as the polypropylene (PP) material flows into the clearance cavity C3 (an arrow in each of these figures). When soft olefin thermoplastic elastomer (TPO) is particularly used as a material of the cover body 20 as in this embodiment, each portion of the outer peripheral edge of the cover body 20 is retreated and deformed according to the applied pressure, as shown by a chain line in each of FIGS. 31 and 32, so that the outer peripheral edge of the cover body 20 is shifted from its predetermined shape, resulting in disadvantages of wavy shape. Here, in this embodiment, as already described, the convex strip 65 and the concave groove 63 are formed on the molding face of the lower mold 6. Therefore, the concave groove 222 and the convex strip 225, as a deformation restricting portion, are formed by the convex strip 65 and the concave groove 63, respectively, on the rear face (a lower face in FIGS. 31 and 32) of the cover body 20 in the semisolid state. The concave groove 222 and the convex strip 225 are engaged with the convex strip 65 and the concave groove 63, respectively, and prevent the retreating deformation of the outer peripheral edge of the cover body 20 against the injecting pressure. Thus, a wavy deforming phenomenon, of the outer peripheral edge of the cover body 20, is effectively dissolved. The concave groove 222 is the deformation restricting portion for restricting the deformation of the outer peripheral edge of the cover body 20, and also has a function for forming the thin wall portion 23, which ruptures at the inflating time of the airbag at the outer peripheral edge of the cover body 20.

Embodiment 21

When a hard material, such as a polyphenylene ether (PPE)/polyamide (PA) alloy and polystyrene (PS) elastomer, is used instead of a soft material, such as the olefin thermoplastic elastomer (TPO), as a material of the cover body 20, it is not necessary to form the convex strip 225, as the deformation restricting portion, and the concave groove 63, of the lower mold 6, for forming this convex strip 225.

For example, a denatured polyphenylene (PPE) can be used in addition to the polypropylene (PP), as a material of the main body 10 in combination with the polyphenylene (PPE)/polyamide (PA) alloy of the cover body 20. Further, for example, a polycarbonate (PC)/acrylonitrile butadiene styrene (ABS) alloy and the like can be used as the material of the main body 10 in combination with the polystyrene (PS) elastomer.

The cross-sectional shapes of the concave groove 222 and the convex strip 225, and the convex strip 65 and the concave groove 63 are not necessarily limited to the angular shape, as shown in Embodiment 20, but may be set to a cross-sectional shape having a face engaged with a mold face and preventing the retreating deformation of the outer peripheral edge of the airbag cover. However, in this case, the cross-sectional shape of the concave groove 222 (i.e., the convex strip 65) is required to be formed into a shape such that the thin wall portion 23 is formed. Further, it is not necessary that the concave groove 222 and the convex strip 225 are continuously formed on the rear face of the cover body 20 at its outer peripheral edge. The concave groove 222 and the convex strip 225 may be separately spaced from each other. For example, effects of the deformation restriction can also be obtained when a concave groove, engaged with the convex strip formed on the mold face and having the same cross-sectional shape as the concave groove 222, is formed instead of the convex strip 225.

Embodiment 22

Figure 33:
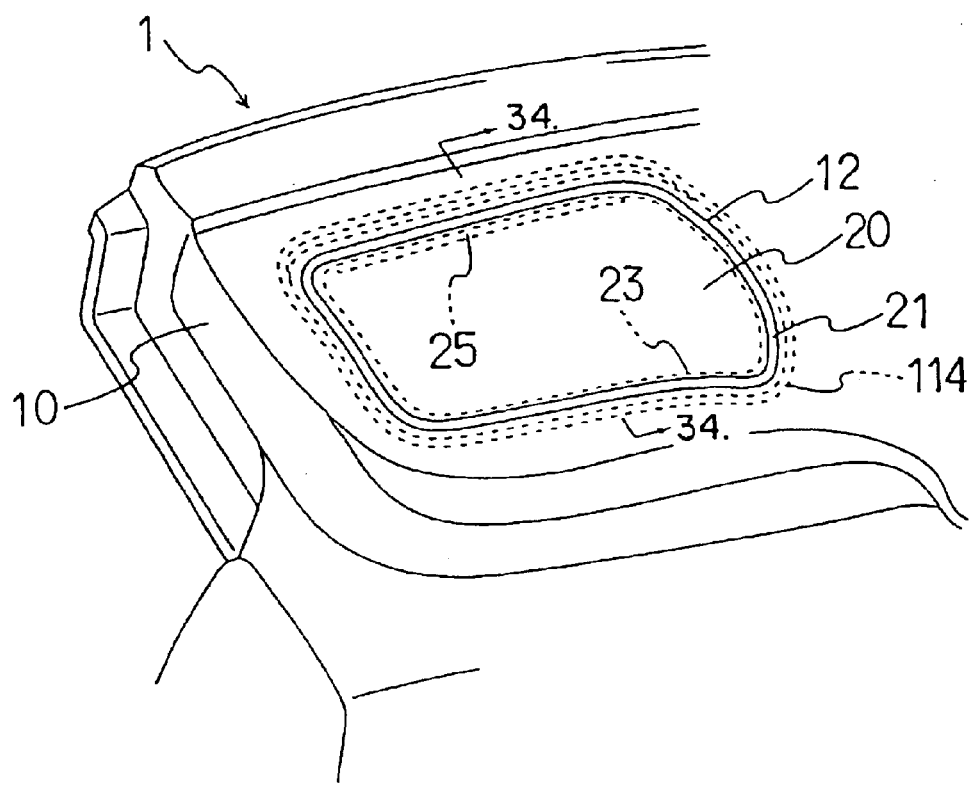
FIG. 33 is a perspective view of a panel for an airbag according to Embodiment 22.
Figure 34:
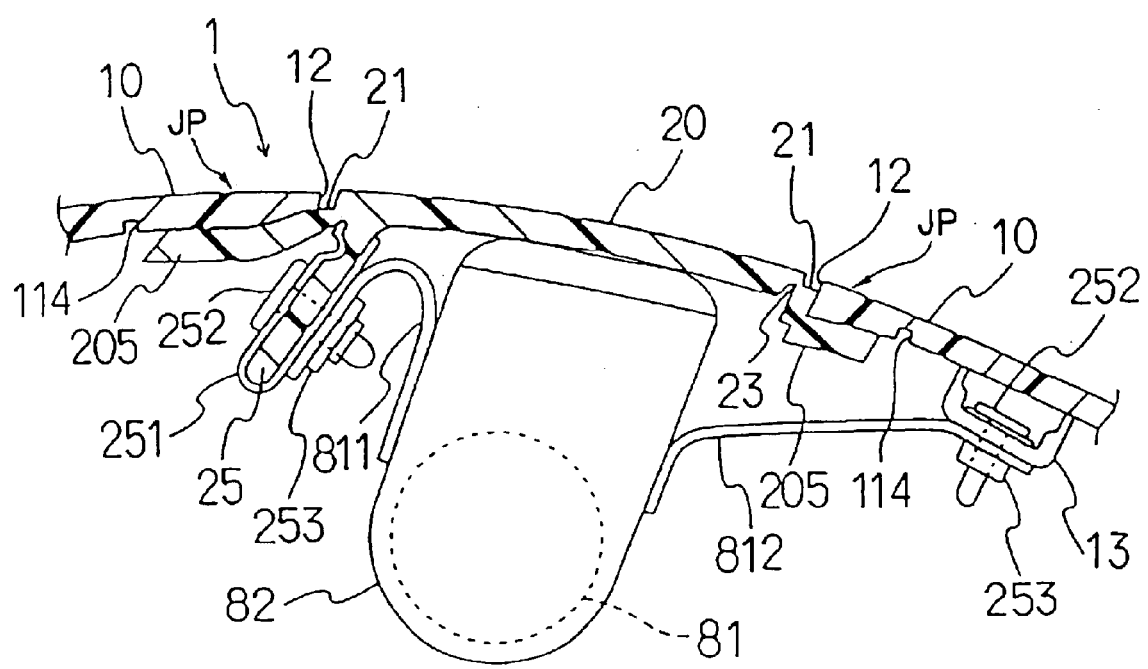
FIG. 34 is a cross-sectional view taken along a line 34—34 of FIG. 33.

FIG. 33 shows an enlarged perspective view of a forward passenger seat side part of an instrument panel as an example of the panel 1 for an airbag. The instrument panel is formed by a thermoplastic hard synthetic resin material, such as polypropylene (PP), mixed with rubber and a filler. An opening portion 12, having a substantially rectangular shape, is formed on an upper face of a main body 10 of the instrument panel in its central position in a back and forth direction (a slanting vertical direction in FIG. 33) of the main body 10. This opening portion 12 is closed by a cover body 20, molded by integrally two-color molding described later, and constructed by olefin thermoplastic elastomer (TPO), etc. FIG. 34 shows a cross-section of this opening portion 12.

In FIG. 34, an outer peripheral edge 205 of the cover body 20 is bent along the lower face of a peripheral edge of the opening portion 12 of the main body 10, and this peripheral edge and the outer peripheral edge 205 are melt-bonded to each other. An outer peripheral surface of the cover body 20 is stepwise lowered in its entire periphery so that a groove portion 21 is formed in a concave shape between this outer peripheral surface and an opening peripheral face of the opening portion 12. A rib 25 is formed on a rear face of the cover body 20 on its front side (a left-hand side of the cover body 20 in FIG. 34). This rib 25 extends along this rear face and is projected slantingly forward in the shape of a straight line. This rib 25 is covered with a metallic retainer 251. The rib 25 is connected to a bracket 811 of an airbag case 82 located behind the cover body 20 by a bolt 252 and a nut 253. The airbag case 82, which stores an airbag 81, is fixed by the bolt 252 and the nut 253 to an insert material 13 of the main body 10 with a bracket 812.

The rear face of the cover body 20, along its three sides, except for the front side, is deeply recessed in a surface direction, and a thin wall portion 23, which ruptures at an inflating time of the airbag, is formed between this rear face and the groove portion 21 having the concave shape. Accordingly, when the airbag inflates, the thin wall portion 23 (FIG. 33), on the three sides of the cover body 20, is ruptured so that the cover body 20 is opened into a cabin (upward in FIG. 34), with a portion near a root of the rib 25 as a hinge center, and the airbag swells out of the opening portion 12. Here, a concave groove 114, having a rectangular section, is formed in a loop shape (FIG. 33) on a lower face of the main body 10 in an external position near a melt-bonded portion of the outer peripheral edge 205 of the cover body 20 so as to surround the outer peripheral edge 205. This concave groove 114 constitutes a deformation restricting portion.

Figure 35:
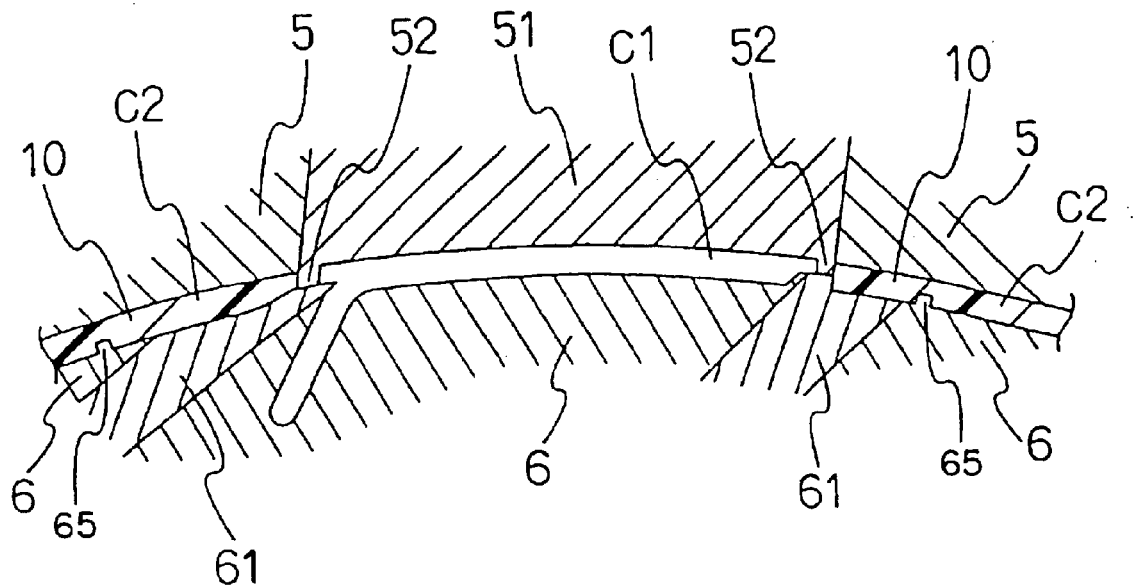
FIG. 35 is a cross-sectional view of a mold in molding the panel for an airbag according to Embodiment 22.

Such a panel 1 for the airbag is produced by two-color molding explained below. Namely, in FIG. 35, a convex strip 52, having the same shape as the groove portion 21 having the concave shape, is formed in a slide type opposite mold 51 within an upper mold 5 in an outer periphery of its molding face. An end face of a slide core 61 within a lower mold 6 comes into press contact with an end face of this convex strip 52, and a cover body molding cavity C1 and a main body molding cavity C2, outside this cavity C1, are separated from each other. A convex strip 65, having a rectangular cross-section and a predetermined height, is formed on a molding face of the lower mold 6 so as to surround the exterior of the slide core 61. This convex strip 65 is projected into the main body molding cavity C2. A hard synthetic resin material is injected into such a main body molding cavity C2 so that the main body 10 is molded.

Figure 36:
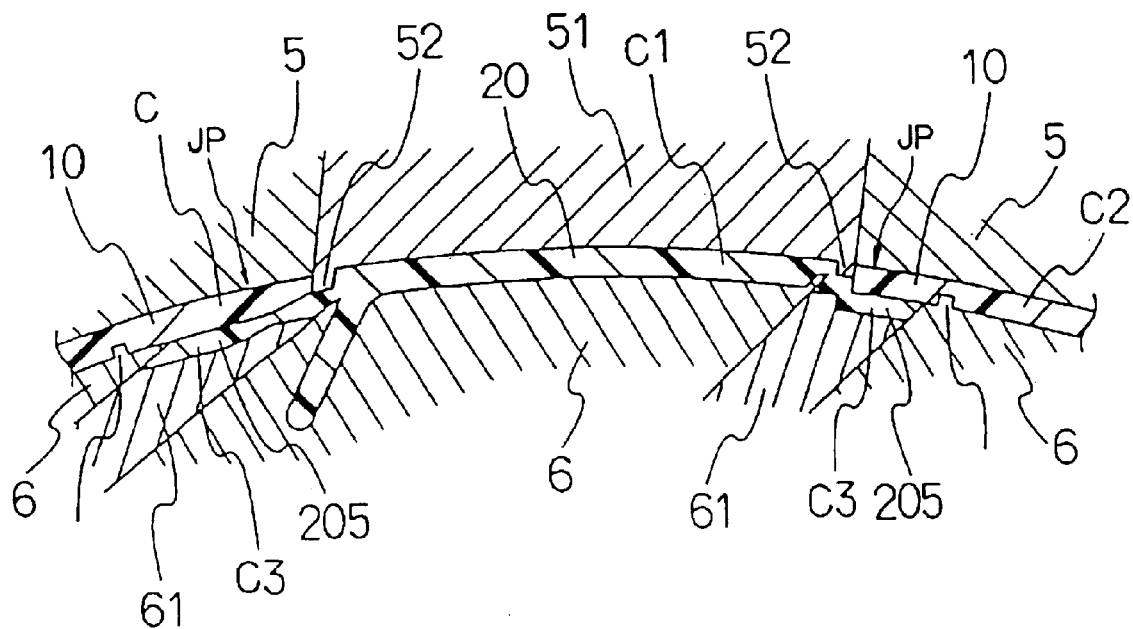
FIG. 36 is a cross-sectional view of a mold in molding a cover body according to Embodiment 22.

While the hard synthetic resin material within the main body molding cavity C2 is yet in a semisolid state, the slide core 61 is subsequently retreated by a constant amount, as shown in FIG. 36, and the main body molding cavity C2 and the cover body molding cavity C1 communicate with each other. In this state, a thermoplastic elastomer material, compatible with the hard synthetic resin material, is injected into the cover body molding cavity C1. The cover body molding cavity C1 is filled with the elastomer material. This elastomer material also enters a clearance cavity C3 caused by retreating the slide core 61 and becomes an outer peripheral edge 205 of the cover body 20 and is melt-boded to a lower face of the main body 10 in the semisolid state.

Figure 37:
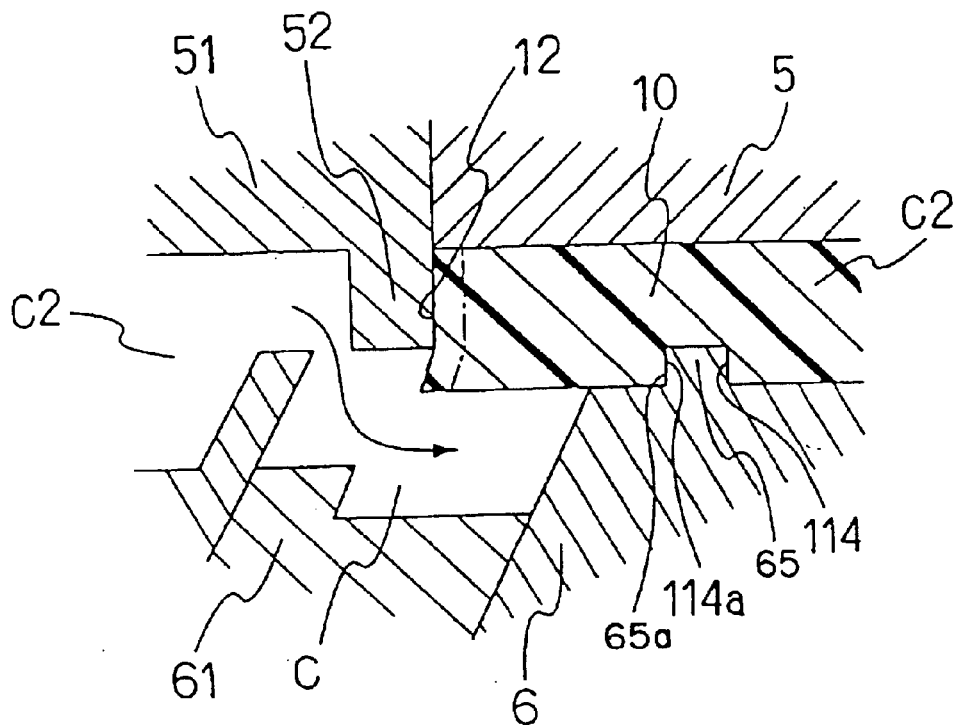
FIG. 37 is a cross-sectional view of a substantial part of the mold in molding the panel for an airbag according to Embodiment 22.

As shown in FIG. 37, as the elastomer material flows into the clearance cavity C3 (an arrow in FIG. 37), a large injecting pressure is applied to the main body 10 in the semisolid state and each portion of the peripheral edge of the opening portion 12 of the main body 10 is retreated and deformed, according to the applied pressure, as shown by a chain line in FIG. 37. Thus, as described in the conventional problems, the peripheral edge of the opening portion 12 is shifted from its predetermined shape, resulting in a wavy shape. Here, in this embodiment, as already described, the convex strip 65, having a predetermined height, is formed on a molding face of the lower mold 6. Therefore, the above-mentioned concave groove 114, as a deformation restricting portion, is formed by this convex strip 65 on the rear face (a lower face in FIG. 37) of the main body 10 in the semisolid state. A side face 114*a* of the concave groove 114 is engaged with a side face 65*a* of the convex strip 65 and prevents the retreating deformation of the main body 10 at the peripheral edge of the opening portion 12 against the injecting pressure. As a result, a wavy deforming phenomenon of the opening portion 12 at its peripheral edge is effectively dissolved.

Embodiment 23

Figure 38:
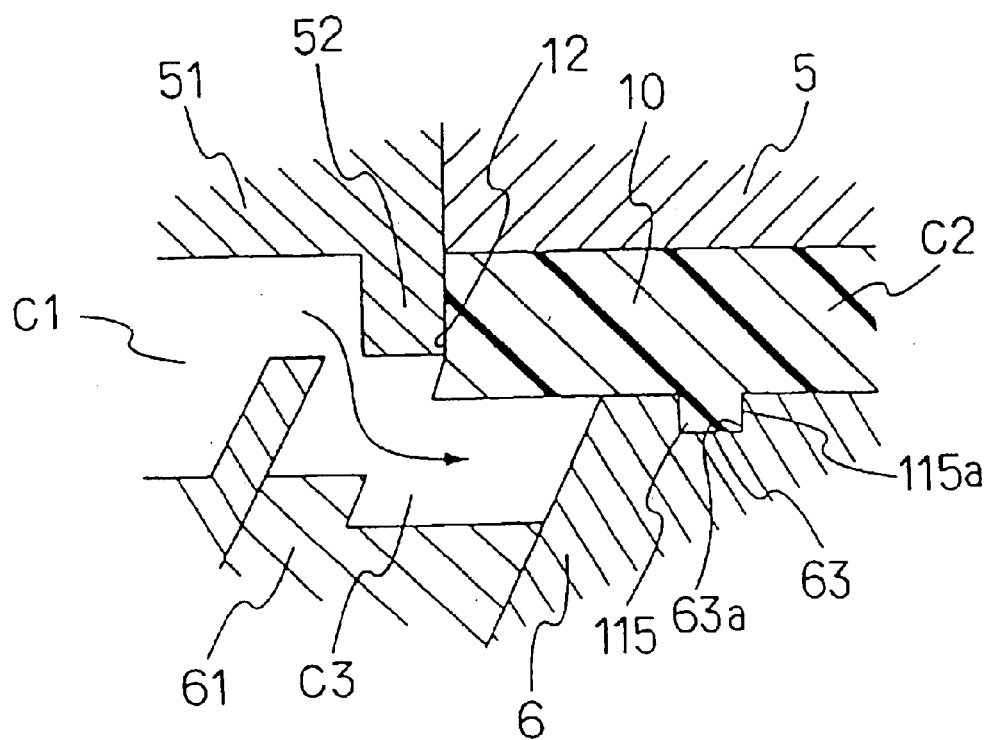
FIG. 38 is a cross-sectional view of a substantial part of a mold in molding a panel for an airbag according to Embodiment 23.

Effects similar to those in Embodiment 22 are also obtained when a concave groove 63, having a rectangular cross-section, is formed as a deformation restricting portion on a molding face of a lower mold 6, as shown in FIG. 38, and a convex strip 115, having a rectangular cross-section, and a side face 115*a*, engaged with a side face 63*a* of the concave groove 63, is formed on the rear face of the main body 10. In this case, it is advantageous in strength since no thickness of the main body 10 is reduced.

Embodiment 24

The cross-sectional shape of the deformation restricting portion is not necessarily set to the rectangular shape as in each of Embodiments 22 and 23, but may be set to such as a curved surface, if the cross-sectional shape has a face engaged with the mold face and thereby, preventing the retreating deformation of the main body at the peripheral edge of the opening portion. Further, it is not necessary to continuously form this deformation restricting portion so as to surround a main body peripheral edge portion, but may be separately spaced from each other.

Embodiment 25

Figure 39:
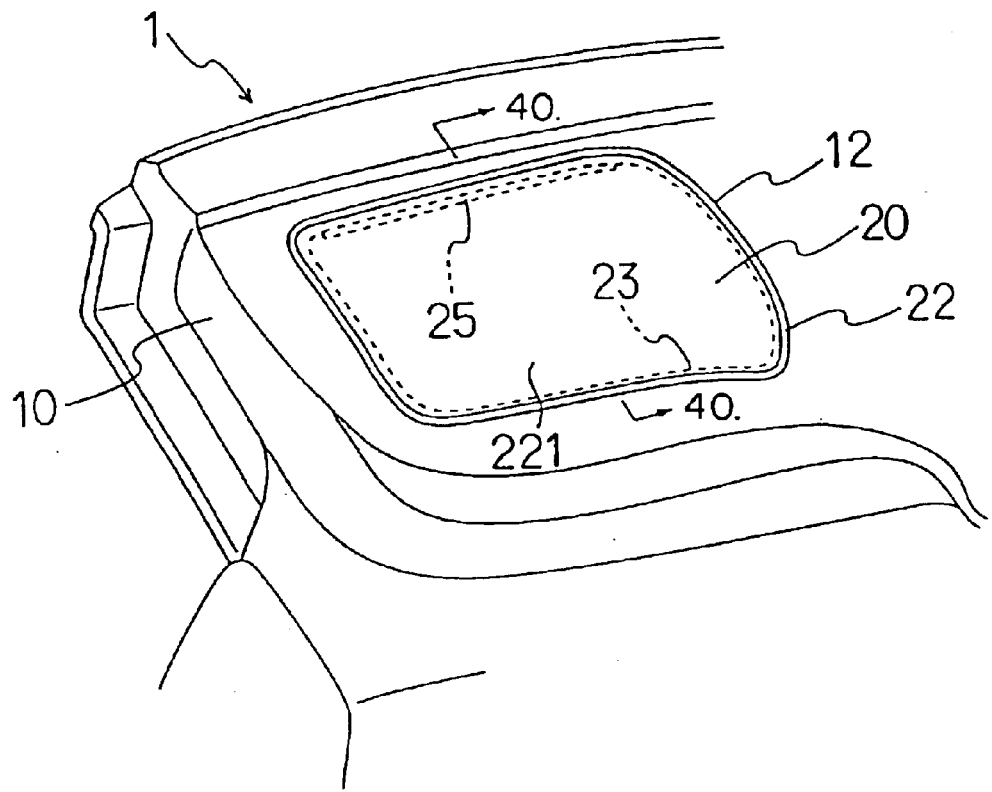
FIG. 39 is a perspective view of a panel for an airbag according to Embodiment 25.
Figure 40:
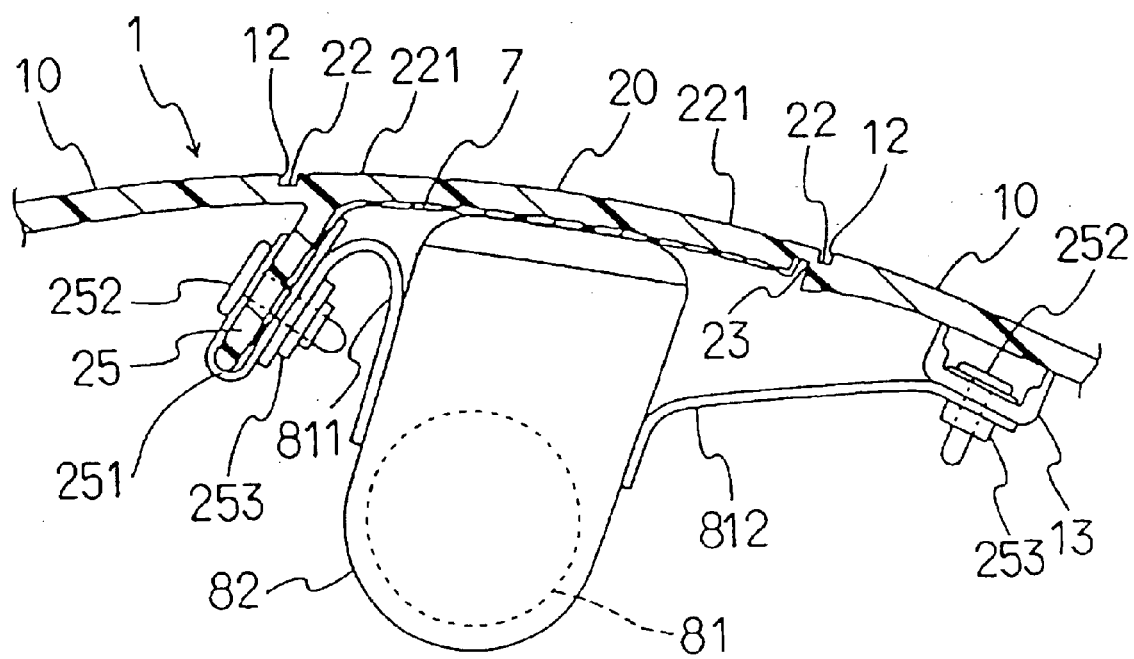
FIG. 40 is a cross-sectional view taken along a line 40—40 of FIG. 39.

FIG. 39 shows an enlarged perspective view of a forward passenger seat side part of an instrument panel as an example of the panel 1 for an airbag. The instrument panel is formed by polypropylene (PP), as a hard synthetic resin material, mixed with rubber, a filler and the like. An opening portion 12, having a substantially rectangular shape, is formed on an upper face of a main body 10 of the instrument panel in its central position in a back and forth direction (a slanting vertical direction in FIG. 39) of the main body 10. This opening portion 12 is closed by a cover body 20, integrally molded with the main body 10 by one-color molding described later, and constructed by a polypropylene (PP) material. FIG. 40 shows a cross-section of this opening portion 12.

In FIG. 40, an outer peripheral edge 221 of the cover body 20 is partitioned off from the main body 10 by a groove portion 22, having a rectangular cross-section, and a concave shape and is formed along an entire periphery of the outer peripheral edge 221. The outer peripheral edge 221 is continuously connected to the main body 10. A rib 25 is formed on a rear face of the cover body 20 on its front side (a left-hand side of the cover body 20 in FIG. 40). This rib 25 extends along this rear face and is projected slantingly forward in the shape of a straight line. This rib 25 is covered with a metallic retainer 251. The rib 25 is connected to a bracket 811 of an airbag case 82 located behind the cover body 20 by a bolt 252 and a nut 253. The airbag case 82, in which an airbag 81 is stored, is fixed by the bolt 252 and the nut 253 to an insert material 13 of the main body 10 with a bracket 812.

The rear face of the cover body 20, along its three sides, except for the front side, is deeply recessed towards the surface, and a thin wall portion 23, which ruptures at an operating or expanding time of the airbag, is formed between this rear face and the groove portion 22 having the concave shape. Further, a crack preventing layer 7 is formed on the rear face of a general portion of the cover body 20 from the rib 25 to a portion near the thin wall portion 23. In this embodiment, a net having many small holes and made of polyamide (PA) is used as this crack preventing layer 7. This crack preventing layer or net 7 made of polyamide (PA) has a sufficient flexibility and tensile strength. When the airbag inflates, the thin wall portion 23 (FIG. 39), on the three sides of the cover body 20, is ruptured so that the cover body 20 is opened into a cabin (upward in FIG. 40), with a portion near a root of the rib 25 as a hinge center, and the airbag swells out of the opening portion 12. When the cover body 20 is rotated and opened with a portion near the root of the rib 25 as a hinge center, the crack preventing layer or net 7, made of polyamide (PA), is joined on the rear face of the general portion of the cover body 20 so that no cover body 20 is cracked to form broken pieces.

Figure 41:
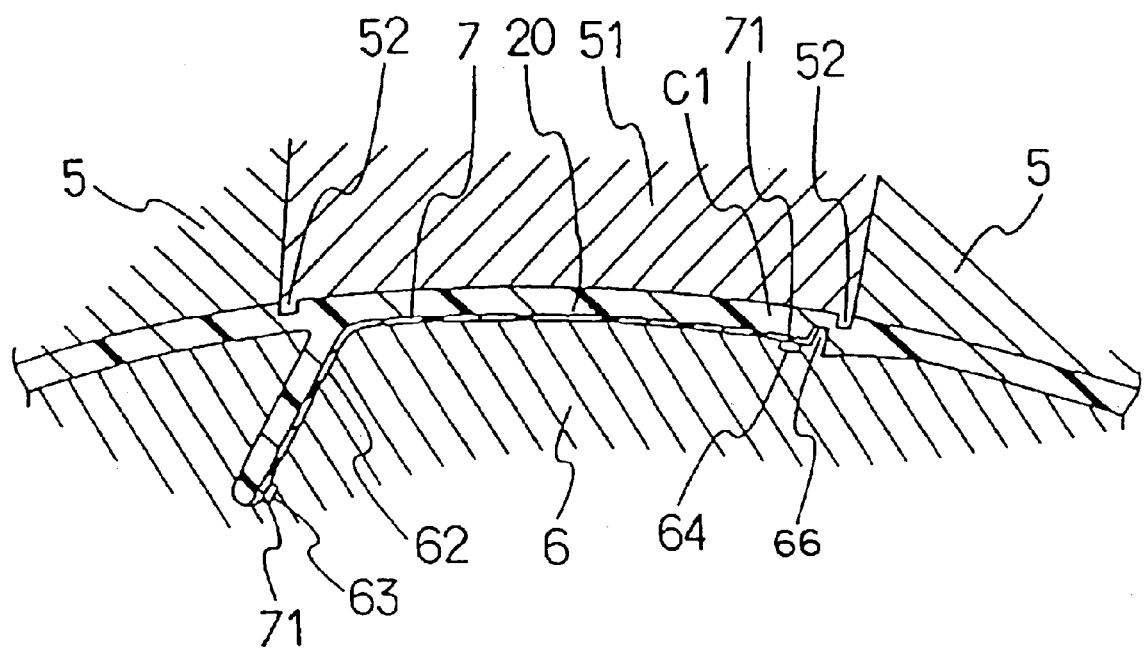
FIG. 41 is a cross-sectional view of a mold in molding the panel for an airbag according to Embodiment 25.

Such a panel 1 for the airbag is produced by one-color insert molding explained below. Namely, in FIG. 41, a convex strip 52, for forming the groove portion 22 having the concave shape, is formed in a slide type opposite mold 51 within an upper mold 5 in an outer periphery of its molding face. In contrast to this, a convex strip 66, for forming the thin wall portion 23, and a columnar concave portion 62, for forming the rib 25, are formed on a molding face of a lower mold 6. A continuous molding cavity C1, for integrally molding the main body 10 and the cover body 20, is formed between the upper mold 5 and the lower mold 6.

The crack preventing layer or net 7, made of polyamide (PA), is arranged on a molding face of the lower mold 6 from one side face of the columnar concave portion 62 to one side face of the convex strip 66. In this crack preventing layer or net 7, made of polyamide (PA), an engaging piece 71, formed in a required position of an outer peripheral edge of the crack preventing layer or net 7, is inserted into concave portions 63, 64 for engagement formed on the molding face of the lower mold 6 and is positioned. A polypropylene (PP) material is injected into such a molding cavity C1 so that the main body 10 and the cover body 20 are integrally molded and the crack preventing layer or net 7, made of polyamide (PA), is joined onto the rear face of the cover body 20. At this time, the polypropylene (PP) material also enters each of the small holes of the crack preventing layer or net 7, made of polyamide (PA), and is strongly joined with the cover body 20. Further, since the engaging piece 71 is inserted into the concave portions 63 and 64 for engagement and is positioned, no shift in position of the crack preventing layer or net 7, made of polyamide (PA), is caused even when an injecting pressure of the polypropylene (PP) material is applied to this crack preventing layer or net 7.

The crack preventing layer or net 7 can be constructed by using a soft resin material, a film of a soft elastomer material such as olefin thermoplastic elastomer (TPO) or nonwoven fabric in addition to the crack preventing layer or net 7, made of polyamide (PA).

Embodiment 26

Figure 42:
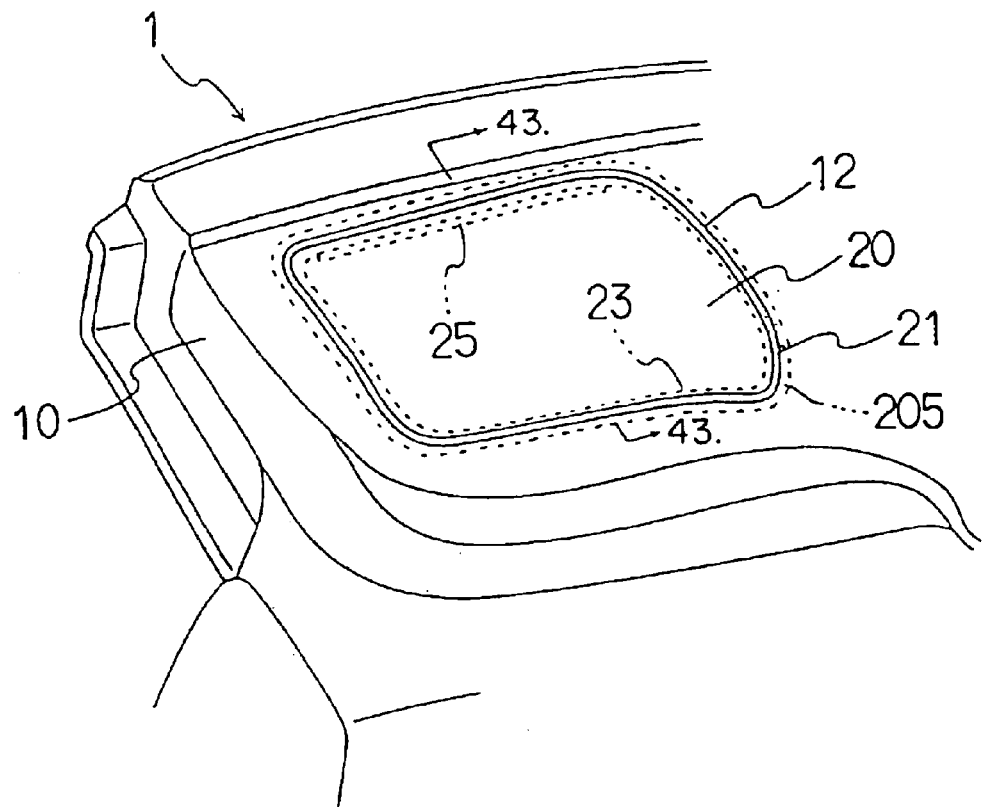
FIG. 42 is a perspective view of a panel for an airbag according to Embodiment 26.
Figure 43:
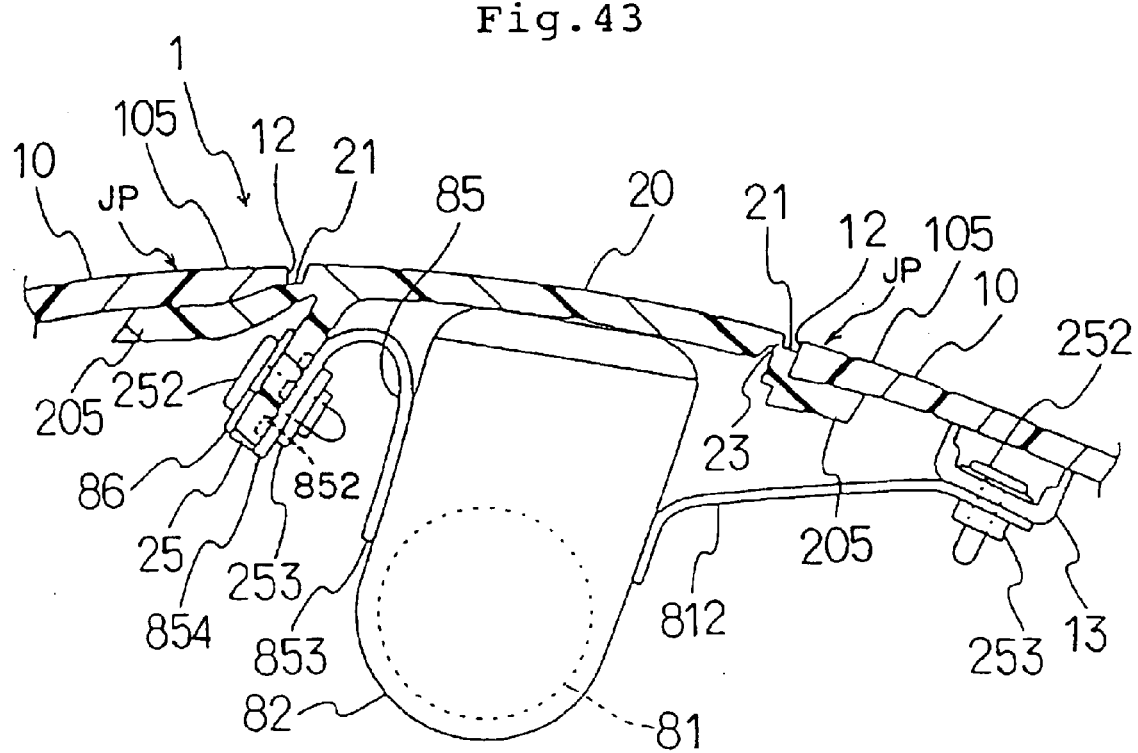
FIG. 43 is a cross-sectional view taken along a line 43—43 of FIG. 42.

FIG. 42 shows an enlarged perspective view of a forward passenger seat side part of an instrument panel as an example of the panel 1 for an airbag. The instrument panel is formed by a thermoplastic hard synthetic resin material, such as polypropylene (PP), mixed with rubber, a filler and the like. An opening portion 12, having a substantially rectangular shape, is formed on an upper face of a main body 10 of the instrument panel in its central position in a back and forth direction (a slanting vertical direction in FIG. 42) of the main body 10. This opening portion 12 is closed by a cover body 20, integrally molded by two-color molding, and constructed of an olefin thermoplastic elastomer (TPO) or the like. FIG. 43 shows a cross-section of this opening portion 12.

In FIG. 43, an outer peripheral edge 205 of the cover body 20 is bent along the lower face of a peripheral edge of the opening portion 12 of the main body 10, and this peripheral edge and the outer peripheral edge 205 are melt-bonded to each other. An outer peripheral surface of the cover body 20 is stepwise lowered in its entire periphery so that a groove portion 21 is formed in a concave shape between this outer peripheral surface and an opening peripheral face of the opening portion 12. A rib 25, having a plate shape and a constant thickness, is formed on a rear face of the cover body 20 on its front side (a left-hand side of the cover body 20 in FIG. 43). This rib 25 extends along this rear face and is projected slantingly forward in the shape of a straight line. A bracket 85, as a connecting member described in more detail below, is connected to this rib 25. The bracket 85 reaches an airbag case 82 which stores an airbag 81. This airbag case 82 is fixed by a bolt 252 and a nut 253 to an insert material 13 of the main body 10 with a bracket 812.

The rear face of the cover body 20, along its three sides, except for the front side, is deeply recessed towards the surface, and a thin wall portion 23, which ruptures at an inflating time of the airbag, is formed between this rear face and the groove portion 21 having the concave shape. Accordingly, when the airbag inflates, the thin wall portion 23 (FIG. 42), on the three sides of the cover body 20, ruptures so that the cover body 20 is opened into a cabin (upward in FIG. 43), with a portion near a root of the rib 25 as a hinge center, and the airbag swells out of the opening portion 12.

Figure 44:
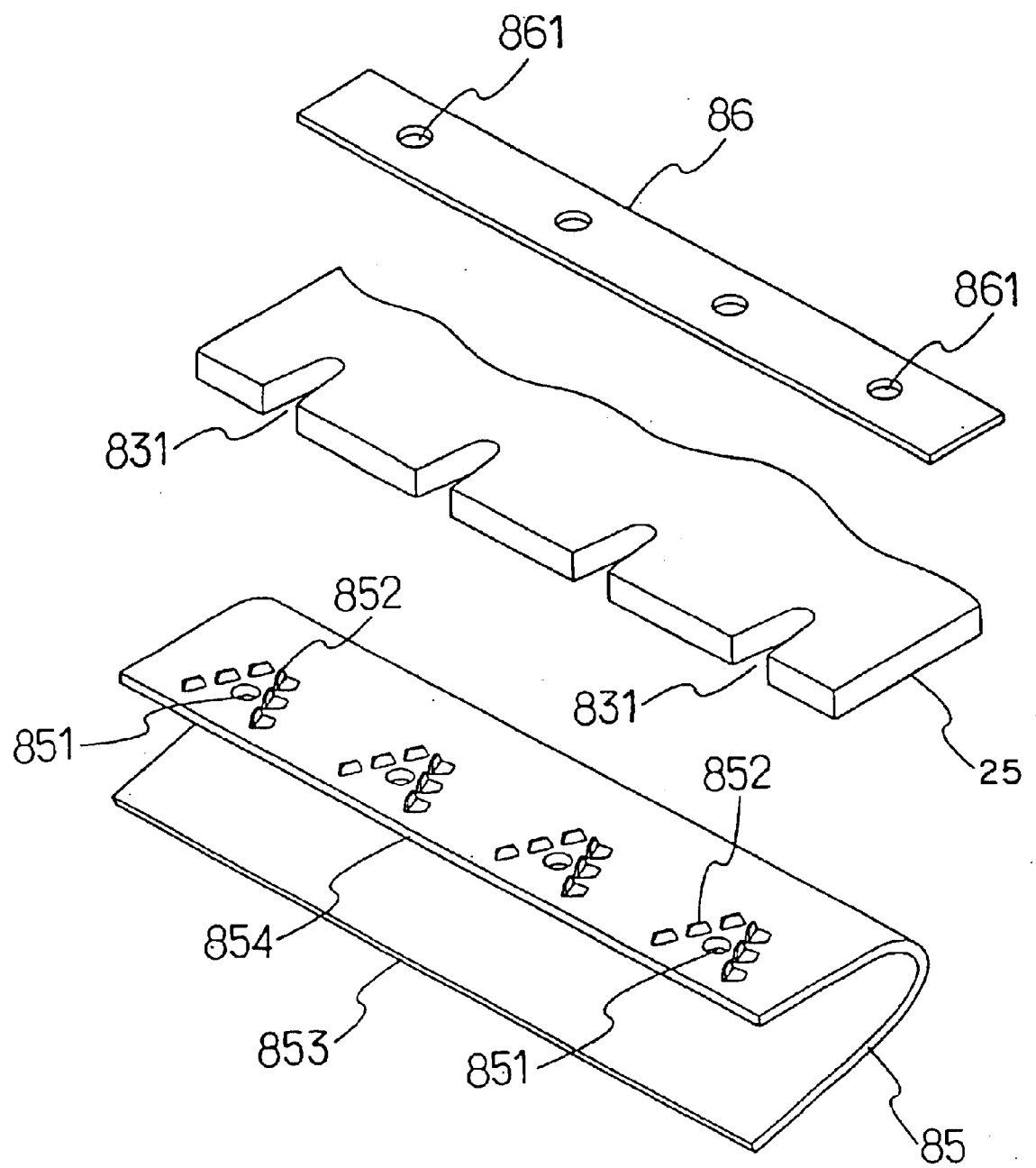
FIG. 44 is an exploded perspective view of a joint portion of a rib and a bracket according to Embodiment 26.

As already mentioned above, the bracket 85 is connected to the rib 25 and its detailed construction will next be explained. As shown in FIG. 44, each of notches 831 is formed in a U-shape in an end tip portion of the rib 25 on its plate face. The notches 831 are spaced from each other in a width direction of the rib 25 and extend from an end tip of the rib 25 to the plate interior in plural positions (four positions in this embodiment). The bracket 85 is formed by curving a metallic plate body, having a constant width, in a substantially U-shape. A base end 853 of the bracket 85 is joined with a side face of the airbag case 82 (FIG. 43) and a plate face of an end tip 854 of the bracket 85 is located along a lower face of the rib 25.

Figure 45:
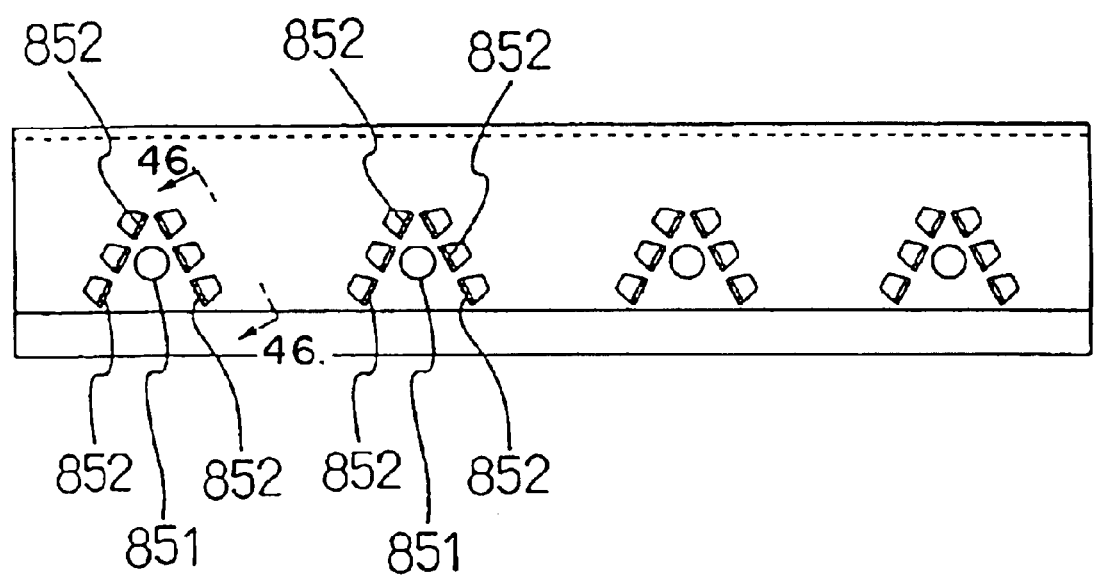
FIG. 45 is a plan view of the bracket according to Embodiment 26.
Figure 46:
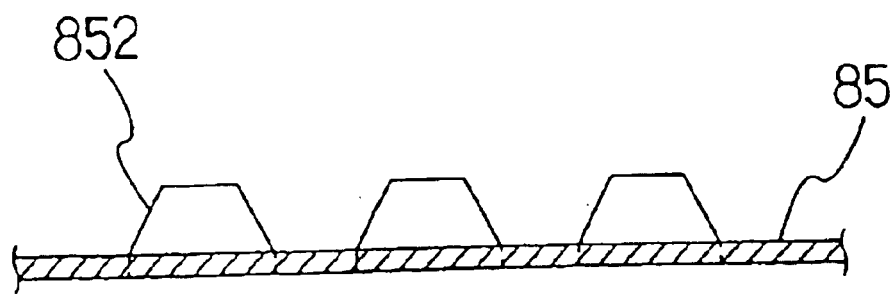
FIG. 46 is a cross-sectional view taken along a line 46—46 of FIG. 45.
Figure 47:
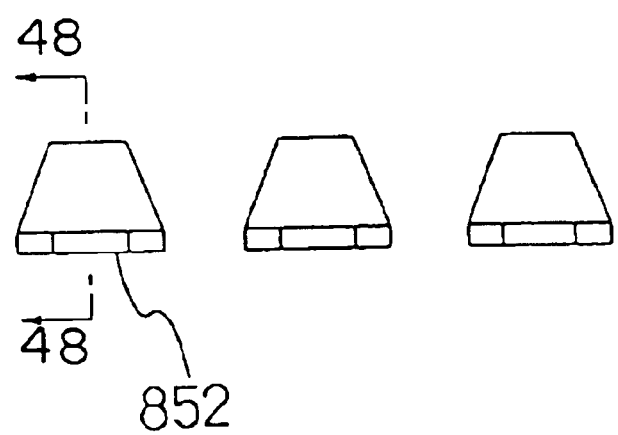
FIG. 47 is an enlarged plan view of a protrusion-forming portion according to Embodiment 26.
Figure 48:
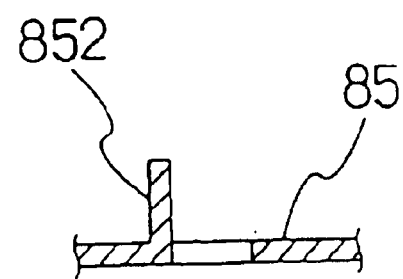
FIG. 48 is a cross-sectional view taken along a line 48—48 of FIG. 47.

Fixing holes 851 are spaced from each other in the width direction on the plate face of the end tip 854 of the bracket 85 and are located in the same positions as the notches 831. As shown in FIG. 45, plural (three on each of left-hand and right-hand sides in this embodiment) projections 852 are formed in left-hand and right-hand positions of the respective fixing holes 851 such that these projections 852 form an inverse V-shape. As shown in FIG. 46, these projections 852 are formed into a trapezoidal shape by punching the plate face of the end tip 854 of the bracket 85 and cut-rising this plate face (FIGS. 47 and 48). As shown in FIG. 43, a retainer plate 86, made of a metal, is located on an upper face of the rib 25 and is constructed by an elongated plate (FIG. 44) having a length approximately equal to the width of the rib 25. Fixing holes 861 are formed on a face of the retainer plate 86 in the same positions as the notches 831 of the rib 25.

The rib 25 and the bracket 85 are connected to each other by locating the respective fixing holes 861 and 851 of the retainer plate 86 and the bracket 85 in conformity with positions of the notches 831 of the rib 25, and inserting a bolt 252 (FIG. 43) into each of these fixing holes 861 and 851 and fastening this bolt 252 by a nut 253. In this fastening, the projections 852, formed on the plate face of the end tip 854 of the bracket 85, bite into the plate face of the rib 25 formed by a synthetic resin material. When the airbag is operated, the thin wall portion 23 (FIG. 42) is ruptured as the airbag inflates as already mentioned above. The cover body 20 is rotated and opened into a cabin with a portion near a root of the rib 25 as a hinge center. At this time, the heat of an inflater within the airbag case 82 is transmitted to the cover body 20 so that the synthetic resin material of the cover body 20 is softened and a pulling-up force is upwardly applied to the cover body 20. Here, since the projections 852 of the bracket 85 bite into the rib 25 of the cover body 20 so that the rib 25 and the bracket 85 are connected to each other, no rib 25 is separated from the bracket 85 even when the synthetic resin material is softened in this biting portion. Thus, scattering of the cover body 20 can be reliably prevented.

Embodiment 27

Figure 49:
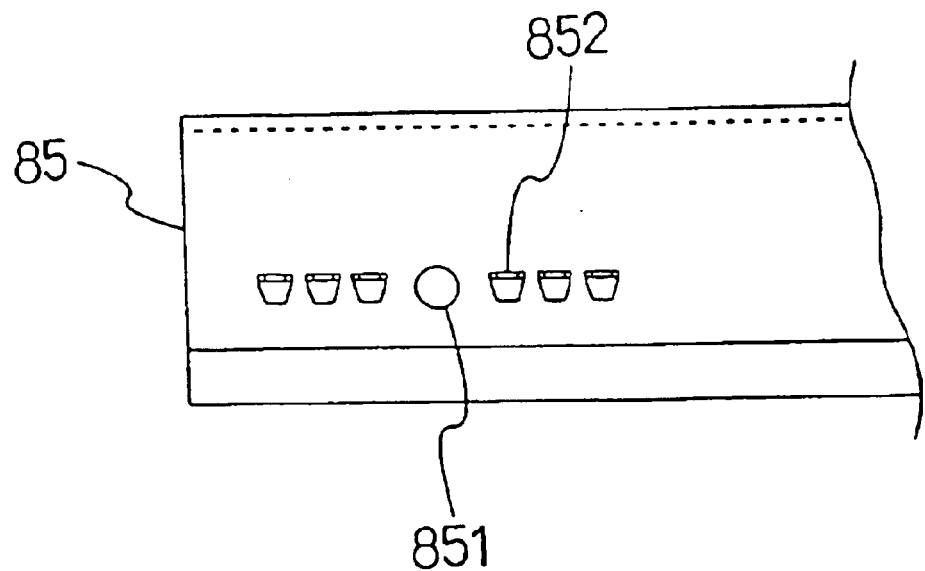
FIG. 49 is a partial enlarged plan view of a bracket according to Embodiment 27.
Figure 50:
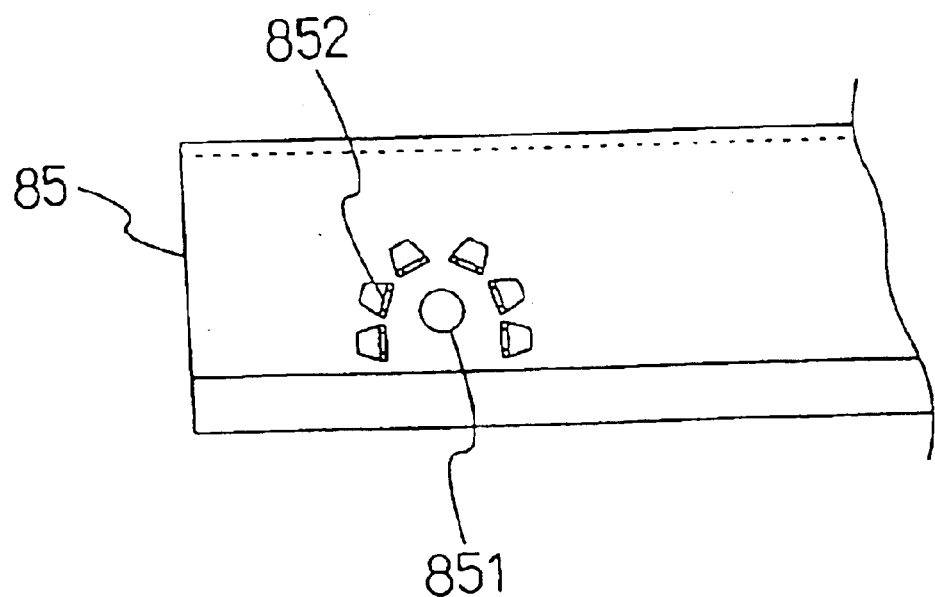
FIG. 50 is a partial enlarged plan view of another bracket according to Embodiment 27.

The arrangement of the projections 852 is not limited to that in Embodiment 26. For example, as shown in FIG. 49, the projections 852 may be arranged in a straight line in left-hand and right-hand positions of the fixing holes 851, or may be arranged in a horseshoe shape surrounding each of the fixing holes 851, as shown in FIG. 50. Further, the shape of the projections 852 is not limited to that in Embodiment 26, if the projections 852 easily bite into the synthetic resin material of the rib 25. For example, the projections 852 can be formed in such as a wedge shape. Further, since the number of the projections 852 in this arrangement is determined in design according to use, the number of projections 852 in this arrangement is not limited to that in Embodiment 26. In Embodiment 26, the instrument panel as an example is explained as an inner mounting material made of synthetic resin. However, a door trim and the like may be arranged as this inner mounting material. Further, a base end of the bracket 85 may be also fixed to a structural member on an instrument panel side or a door trim side instead of a structure in which this base end is fixed to the airbag case.

What is claimed is:

1. A panel for an airbag of an automobile formed by integrally two-color molding a cover body made of a first synthetic resin with a main body made of a second synthetic resin which is harder than said first synthetic resin material, the panel comprising:

a joint portion joined with the cover body provided around an opening portion formed in the main body, wherein the joint portion constitutes an overlapping portion in which an outer peripheral edge of the cover body overlaps and is provided on the inner side of an opening edge of the main body without a portion of the cover body being provided on an outer side of the opening edge of the main body, and the overlapping portion is welded together in two-color molding the main body with the cover body.

2. The panel for an airbag according to claim 1, wherein a concavo-convex portion having a serrate shape or a downwardly convex shape is formed on a lower face of the main body in the overlapping portion.

3. The panel for an airbag according to claim 1, wherein a surface of a periphery of the cover body has a step portion adjacent to the rear surface of the cover body and facing the edge of the opening portion of the main body, thereby, a groove portion having a closed curve shape is formed in a boundary portion of an end portion of the opening portion of the main body in the cover body, and a first wall portion which is thin and which ruptures and a second wall portion which is at least 1.5 times as thick as the first wall portion and which does not rupture at an operating time of the airbag are formed along the groove portion in the cover body in a single line shape or a shape of plural continuous lines.

4. The panel for an airbag according to claim 3, wherein the second wall portion is formed into a shape so as to have one transverse line on an upper or lower side of the cover body, and the first wall portion is formed in a quadrilateral shape with one side opened along the groove portion in three directions except for the transverse line forming the non-thin wall portion.

5. The panel for an airbag according to claim 3, wherein the second wall portion is formed into a shape so as to have one transverse line on an upper or lower side of the cover body and the first wall portion is formed along an entire periphery of the groove portion such that a line forming the second wall portion is included in an inner side.

6. The panel for an airbag according to claim 3, wherein the second wall portion can be formed into a shape so as to have one transverse line on each of upper and lower sides of the cover body, and the first wall portion is formed into a shape so as to have one longitudinal line on each of left-hand and right-hand sides of the cover body;

wherein a third wall portion which is thin and which is not formed along the groove portion is formed into a shape so as to have one transverse line in a central portion of the cover body; and wherein the first and third wall portions are formed into an H-shape.

7. The panel according for an airbag to claim 3, wherein the second wall portion is formed into a shape so as to have one transverse line on each of upper and lower sides of the cover body, and the first wall portion is formed along an entire periphery of the groove portion such that a line forming the second wall portion is included in an inner side;

wherein a third wall portion which is thin and which is not formed along the groove portion is formed into a shape so as to have one transverse line in a central portion of the cover body; and wherein the first and third wall portions are formed into a shape in which two quadrilaterals are lined up.

8. The panel for an airbag according to claim 3, wherein the second wall portion is formed into a shape so as to have one longitudinal line on each of left-hand and right-hand sides of the cover body, and the first wall portion is formed into a shape so as to have one transverse line on each of upper and lower sides of the cover body;

wherein a third wall portion which is thin and which is not formed along the groove portion is formed into a shape so as to have one longitudinal line in a central portion of the cover; and wherein the first and third wall portions are formed into an H-shape.

9. The panel for an airbag according to claim 3, wherein the second wall portion is formed into a shape so as to have one longitudinal line on each of left-hand and right-hand sides of the cover body, and the first wall portion is formed along an entire periphery of the groove portion such that a line forming the second portion is included with an inner side;

wherein a third wall portion is not formed along the groove portion but is formed into a shape so as to have one longitudinal line in a central portion of the cover body; and wherein the first and third wall portions are formed into a shape in which two quadrilaterals are lined up.

10. A panel for an airbag of an automobile formed by integrally two-color molding a cover body made of a first synthetic resin with a main body made of a second synthetic resin which is harder than said first synthetic resin material, the panel comprising:

a joint portion joined with the cover body provided around an opening portion formed in the main body, wherein the joint portion constitutes an overlapping portion in which an outer peripheral edge of the cover body overlaps and is provided on the inner side of an opening edge of the main body without a portion of the cover body being provided on an outer side of the opening edge of the main body, and the overlapping portion is welded together in two-color molding the main body with the cover body, further comprising a rib projecting into a second wall portion and connected to an airbag case of the airbag through a connecting member.

11. A panel for an airbag of an automobile formed by integrally molding a cover body made of a first synthetic resin which is soft with a main body made of a second synthetic resin which is harder than the first synthetic resin, the panel comprising:

a joint portion joined with the cover body provided around an opening portion formed in the main body, wherein the joint portion constitutes an overlapping portion in which an outer peripheral edge of the cover body overlaps and is provided on the inner side of an opening edge of the main body without a portion of the cover body being provided on an outer side of the opening edge of the main body, and the opening edge of the opening portion of the main body is connected to the outer peripheral edge of the cover body.

12. A panel for an airbag of an automobile comprising:
a cover body made of a first synthetic resin material which is soft; and
a main body made of a second synthetic resin material which is harder than the first synthetic resin material and which is compatible with the first synthetic resin material, the main body being formed by two-color molding after forming the cover body,
wherein the cover body includes a deformation restricting portion provided along each side of the outer peripheral edge of the cover body, the deformation restricting portion being adapted to engage with a mold face,
wherein the main body includes an opening portion which is closed by the cover body; and
wherein the deformation restricting portion restricts deformation of the cover body caused by a molding pressure which acts at a molding time of the main body.

13. A panel for an airbag of an automobile comprising:
a cover body made of a first synthetic resin material which is soft;
a main body made of a second synthetic resin material which is harder than the first synthetic resin material and which is compatible with the first synthetic resin material, the main body being formed by two-color molding after forming the cover body; and
a deformation restricting portion provided along each side of the outer peripheral edge of the cover body, the deformation restricting portion being adapted to engage with a mold face,
wherein the main body includes an opening portion which is closed by the cover body,
wherein the deformation restricting portion restricts deformation of the cover body caused by a molding pressure which acts at a molding time of the main body, and
wherein the deformation restricting portion is constituted of a convex strip having either an angular cross section or a concave groove.

14. A panel for an airbag of an automobile comprising:
a main body having an opening portion, the main body being made of a first synthetic resin material; and
a cover body made of a second synthetic resin material which is softer than the first synthetic resin material and which is compatible with the first synthetic resin material, the cover body being formed by two-color molding after forming the main body,
wherein the main body includes a deformation restricting portion provided along each side of the periphery of the opening portion, the deformation restricting portion being adapted to engage with a mold face,
wherein the opening portion of the main body is closed by the cover body; and
wherein the deformation restricting portion restricts deformation of the main body caused by a molding pressure which acts at a molding time of the cover body.

15. A panel for an airbag of an automobile comprising:
a main body having an opening portion, the main body being made of a first synthetic resin material;
a cover body made of a second synthetic resin material which is harder than the first synthetic resin material and which is compatible with the first synthetic resin material, the cover body being formed by two-color molding after forming the main body; and
a deformation restricting portion provided along each side of the periphery of the opening portion, the deformation restricting portion being adapted to engage with a mold face,
wherein the opening portion of the main body is closed by the cover body,
wherein the deformation restricting portion restricts deformation of the cover body caused by a molding pressure which acts at a molding time of the main body, and
wherein the deformation restricting portion is a convex strip having either an angular cross section or a concave groove.

16. A panel for an airbag of an automobile formed by integrally two-color molding a cover body made of a first synthetic resin with a main body made of a second synthetic resin which is harder than said first synthetic resin material, the panel comprising:
a joint portion joined with the cover body provided around an opening portion formed in the main body,
wherein the joint portion constitutes an overlapping portion in which an outer peripheral edge of the cover body overlaps and is provided on the inner side of an opening edge of the main body without a portion of the cover body being provided on an outer side of the opening edge of the main body, and the overlapping portion is welded together in two-color molding the main body with the cover body,
further comprising:
a rib projecting into the cover body on the rear face of a portion in which no first wall portion is formed;
a connecting member is made of a metal, extends from a side of the main body, and is connected to the rib; and
a projection formed on a surface of the connecting member, the projection biting into a surface of the rib when the connecting member is connected to the rib.

17. A method for producing a panel for an airbag of an automobile formed by integrally molding a cover body made of a first synthetic resin which is soft with a main body made of a second synthetic resin which is harder than the first synthetic resin, the method comprising:
preparing a thermoplastic material having compatibility with each of the first synthetic resin and second synthetic resin forming each of the main body and the cover body, respectively;
arranging a movable core in a male or a female die as a mold;
interrupting a portion between a first cavity portion for forming a first member and a second cavity portion for forming a second member by allowing the core to project and contact an opposite one of the male or female die;

injecting a material of the first member into the first cavity portion;

forming a communicating portion between the first and second cavity portions by retreating the core; and injecting a material of the second member into the second cavity portion and the communicating portion so that an overlapping portion of both the first and second members is formed and adhered and both the first and second members are integrally made.

* * * * *